(12) United States Patent
Tarutani et al.

(10) Patent No.: US 6,379,476 B1
(45) Date of Patent: Apr. 30, 2002

(54) STAINLESS STEEL PRODUCT FOR PRODUCING POLYMER ELECTRODE FUEL CELL

(75) Inventors: Yoshio Tarutani, Sanda; Takashi Doi, Shiga; Akira Seki, Ashiya; Shinji Fukuta, Amagasaki, all of (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 09/548,673

(22) Filed: Apr. 13, 2000

(30) Foreign Application Priority Data

| Apr. 19, 1999 | (JP) | 11-111446 |
| Apr. 22, 1999 | (JP) | 11-115461 |
| May 13, 1999 | (JP) | 11-133218 |
| May 24, 1999 | (JP) | 11-144065 |
| Jul. 22, 1999 | (JP) | 11-208278 |

(51) Int. Cl.$^7$ .................... C22C 38/18; C22C 38/40
(52) U.S. Cl. .................. 148/325; 148/326; 148/327; 134/3; 134/41; 134/27; 429/34
(58) Field of Search .................. 148/325, 326, 148/327, 605–611; 134/3, 41, 27; 429/34

(56) References Cited

U.S. PATENT DOCUMENTS 5,624,769 A  4/1997  Li et al.

FOREIGN PATENT DOCUMENTS

| DE | 19523637 A | 7/1996 |
| DE | 29802444 U | 4/1999 |
| JP | 60154470 A | 8/1985 |
| JP | 04358044 A | 12/1992 |
| JP | 8-180883 | 12/1994 |
| JP | 10228914 A | 8/1998 |
| JP | 11-126620 | 5/1999 |
| JP | 11-126621 | 5/1999 |
| JP | 11-126622 | 5/1999 |
| JP | 11-144744 | 5/1999 |
| JP | 11-162478 | 6/1999 |
| WO | WO82/03231 | 9/1982 |

*Primary Examiner*—Deborah Yee
(74) *Attorney, Agent, or Firm*—Burns, Doane, Swecker & Mathis, LLP

(57) ABSTRACT

The stainless steel product has passive film on the surface, and at least one of a conductive metallic inclusion of carbide and a conductive metallic inclusion of boride protrudes through an outer surface of passive film from stainless steel under the passive film. The stainless steel product has low contact electrical resistance and suitable for use in bipolar plates of a polymer electrode fuel cell.

28 Claims, 5 Drawing Sheets

STAINLESS STEEL PRODUCT FOR PRODUCING POLYMER ELECTRODE FUEL CELL

This application claims priority under 35 U.S.C. §§ 119 and/or 365 to JP 11-111446, 11-115461, 11-133218, 11-144065, 11-208278 filed in Japan on Apr. 19, 1999, Apr. 22, 1999, May 13, 1999, May 24, 1999 and Jul. 22, 1999, respectively, the entire contents of which are herein incorporated by references.

BACKGROUND OF THE INVENTION

1. Field of the Invention

The present invention relates to a stainless steel product having low contact electrical resistance, and to a method for producing the stainless steel product. The invention also relates to a bipolar plate produced from the stainless steel product and to a polymer electrode fuel cell (hereinafter may be abbreviated as PEFC) containing the bipolar plate.

2. Description of the Related Art

Stainless steel has excellent corrosion resistance due to passive film formed on the surface thereof. However, stainless steel is not suitable for producing electrically conductive elements requiring low contact electrical resistance, since the passive film formed on the surface has high electrical resistance. In general, the more excellent the corrosion resistance of passive film, the higher the electrical resistance thereof.

Therefore, reduction in contact electrical resistance of stainless steel enables stainless steel to serve as an electrically conductive element such as a terminal, the element being employed in a circumstance requiring corrosion resistance. One example of an electrically conductive element exhibiting excellent corrosion resistance and low contact electrical resistance is a bipolar plate (also called a "separator") of a PEFC.

A fuel cell generates DC power, and examples of fuel cells include a solid oxide fuel cell (abbreviated as SOFC), a molten carbonate fuel cell (abbreviated as MCFC), and a phosphoric acid fuel cell (abbreviated as PAFC). These fuel cells are named after a component material of an electrolyte, which is the most important portion of a fuel cell.

At present, fuel cells which have attained a commercially satisfactory level include a PAFC and an MCFC.

Approximate operation temperatures of an SOFC, an MCFC, a PAFC, and a PEFC are 1000° C., 650° C., 200° C., and 80° C., respectively.

A PEFC operates at approximately 80° C. and is easy to start and stop. The expected energy efficiency thereof is approximately 40%. Therefore, there is worldwide demand for PEFCs, which can be employed practically in an on-site power source used in a small-scale power plant, a telephone office, or a similar site; a domestic small on-site power source making use of city gas as a fuel; and a power source incorporated in a low-pollution electric automobile making use of hydrogen, methanol, or gasoline as a fuel.

Although the aforementioned fuel cells are categorized as fuel cells, i.e., their names include the term "fuel cell," they must be considered individually when a component material of a fuel cell is designed, since performance required for a component material, particularly anti-corrosion performance, varies with the type of fuel cell.

Specifically, the performance depends on corrosion of a component material caused by an employed electrolyte; oxidation at high temperature predominantly occurring above approximately 380° C.; and sublimation and re-deposition of an electrolyte, and condensation.

In practice, a variety of materials are employed as component materials of a fuel cell; e.g., graphite materials, Ni cladding, alloys having a high alloying element content, and stainless steel.

Thus, materials per se employed in commercialized PAFCs and MCFCs cannot be applied to a component material of PEFCs.

FIGS. 1A and 1B shows the structure of a PEFC; i.e., FIG. 1A is an exploded view of a fuel cell (membrane electrode assemblies) and FIG. 1B is a perspective view of an entire fuel cell. As shown in FIGS. 1A and 1B, a fuel cell 1 is an assembly of membrane electrode assemblies. The membrane electrode assembly comprises a solid polymer electrolyte membrane 2, a fuel electrode (anode) membrane 3 being laminated on one surface of the solid polymer electrolyte membrane 2 and an oxidizing agent electrode (cathode) membrane 4 being laminated on the other surface. The membrane 3 is further layered with a bipolar plate 5a, while the membrane 4 is further layered with a bipolar plate 5b.

The solid polymer electrolyte membrane 2 comprises a proton-conductive fluoride membrane having a hydrogen-ion (proton)-exchange group.

Each of the anode membrane 3 and the cathode membrane 4 is provided with a catalyst layer comprising a granular platinum catalyst, graphite powder, and an optional fluororesin having a hydrogen-ion (proton)-exchange group, which is to come into contact with a fuel gas or an oxidizing gas.

A fuel gas A (hydrogen or a hydrogen-containing gas) is fed through channels 6a provided in the bipolar plate 5a, to thereby supply hydrogen to the anode membrane, while an oxidizing gas B such as air is fed through channels 6b provided in the bipolar plate 5b, to thereby supply oxygen. The thus-supplied gasses induce electrochemical reaction, to thereby generate DC power.

Functions required of a bipolar plate of a PEFC are as follows:

(1) a function of a channel which supplies a fuel gas and an oxidizing gas uniformly in inner planes of a cell;

(2) a function of a channel which effectively discharges water formed in cathode portions to outside a fuel cell along with a carrier gas such as air or oxygen after reaction;

(3) a function of an electrical connector between membrane electrode assemblies so as to maintain low resistance and high conductivity suitable for an electrode for a long period of time;

(4) a function of a separator which separates a cathode chamber and an anode chamber in adjacent assemblies; and (5) a function of a separator which isolates cooling water channels and separates adjacent assemblies.

Hitherto, there has been earnestly investigated application of a carbon sheet as a material of a bipolar plate of a PEFC. However, a carbon sheet is disadvantageous in that the sheet is easily fractured and severely elevates cost of mechanical processing for producing a flat surface and forming gas channels. These fatal problems might make commercialization of a fuel cell difficult.

Among carbonaceous materials, thermally expandable graphite has been most attractive material for producing a bipolar plate of a PEFC, in that the graphite is considerably inexpensive. However, in order to provide functions of the aforementioned separators by means of reducing gas-permeability, thermally expandable graphite must be subjected to a plurality of steps of resin impregnation and firing. In addition, there still remain problems in cost of mechanical processing for ensuring surface flatness and forming channels. Thus, commercialization of thermally expandable graphite has not yet been attained.

In contrast to investigation of application of graphite materials, stainless steel has been applied to a bipolar plate, in view of cost reduction.

Japanese Patent Application Laid-Open (kokai) No. 10-228914 discloses a fuel cell bipolar plate which is formed of a metallic material, in which a surface of the bipolar plate which contacts with a membrane electrode assembly is plated directly with gold. Examples of metallic materials include stainless steel, aluminum, and Ni-Fe alloy, with Type 304 being employed as stainless steel. According to the disclosure, the bipolar plate is plated with gold, to thereby lower contact resistance between the bipolar plate and an electrode and enhance electric conduction from the bipolar plate to the electrode. Thus, a fuel cell containing such bipolar plates is considered to generate high output power.

Japanese Patent Application Laid-Open (kokai) No. 8-180883 discloses a PEFC employing bipolar plates formed of a metallic material which is easily coated with passive film in air. According to the disclosure, the metallic surface of the bipolar plates is completely coated with passive film, to thereby make the surface resistant to chemical substances. Thus, ionization of water formed in the fuel cell is suppressed, to thereby suppress lowering efficiency of electrochemical reaction. It is also disclosed that passive film on a portion contacting with an electrode membrane of a bipolar plate is removed and a layer of a noble metal is formed, to thereby lower contact electrical resistance.

However, even though the disclosed metallic materials such as stainless steel coated with passive film per se are employed, bipolar plates produced from the materials exhibit poor corrosion resistance and release metal ions. The released metal ions form corrosion products such as chromium hydroxide and iron hydroxide, to thereby disadvantageously elevate contact electrical resistance of the bipolar plates. Thus, at present, bipolar plates are plated with a noble metal such as gold, despite the cost thereof.

SUMMARY OF THE INVENTION

In view of the foregoing, an object of the present invention is to provide stainless steel products having low contact electrical resistance for producing an electricity-conducting element. Another object of the invention is to provide a bipolar plate formed of the stainless steel product. Still another object of the invention is to provide a PEFC comprising the bipolar plate formed of the stainless steel product.

Accordingly, the present invention is directed to the followings.

(1) A stainless steel product exhibiting low contact electrical resistance, wherein at least one of a conductive metallic inclusion of carbide and a conductive metallic inclusion of boride protrudes through an outer surface of passive film from stainless steel under the passive film.

(2) A bipolar plate for fabricating a polymer electrode fuel cell, which bipolar plate comprises a stainless steel product as recited in (1).

(3) A method for producing a stainless steel product which comprises corroding the surface of a stainless steel product by use of an aqueous acidic solution to thereby expose at least one of a conductive metallic inclusion of carbide and a conductive metallic inclusion of boride on the surface; neutralizing the product by use of an aqueous alkaline solution having a pH of 7 or more; and washing and drying the product.

(4) A polymer electrode fuel cell in which a fuel gas and an oxidizing agent gas are supplied to an assembly produced by laminating a plurality of membrane electrode assemblies while inserting a bipolar plate between membrane electrode assemblies to thereby generate DC power, which fuel cell has a bipolar plate as recited in (2).

As used herein, the term "a conductive metallic inclusion of carbide" refers to as a metallic inclusion of carbide such as $M_{23}C_6$, $M_4C$, $M_2C$, MC or any mixture thereof and the term "a conductive metallic inclusion of boride" refers to a metallic inclusion of boride such as $M_2B$. The symbol "M" represents a metallic element, which is not limited to a specific metal and can be any metal exhibiting strong affinity with C or B. Typically, M predominantly comprises Cr and Fe and contains microamounts of Ni and Mo. Examples of $M_{23}C_6$ metallic inclusions include $Cr_{23}C_6$ and $(Cr, Fe)_{23}C_6$. Examples of $M_2C$ metallic inclusions include $Mo_2C$. Examples of MC metallic inclusions include WC. Examples of $M_2B$ metallic inclusions include $Cr_2B$, $(Cr, Fe)_2B$, $(Cr, Fe, Ni)_2B$, $(Cr, Fe, Mo)_2B$, and $(Cr, Fe, Ni, Mo)_2B$, $Cr_{1.2}Fe_{0.76}Ni_{0.04}B$. Examples of $M_4B$ metallic inclusions include $B_4C$. In principle, any metallic inclusion exhibiting excellent electrical conductivity may exhibit similar performance.

The subscript "2" in "$M_2B$" refers to a stoichiometric coefficient represented by [(Cr mass %/Cr atomic weight)+ (Fe mass %/Fe atomic weight)+(Mo mass %/Mo atomic weight)+(Ni mass %/Ni atomic weight)+(X mass %/X atomic weight)]/(B mass %/B atomic weight) of approximately 2, wherein X represents a metal element other than Cr, Fe, Mo, and Ni. This style of expression is not specific, but very general.

In addition, a metallic inclusion of carbide such as $M_{23}C_6$, $M_4C$, $M_2C$, or MC or a metallic inclusion of boride such as $M_2B$ also encompasses a metallic inclusion precipitated in the form as described below.

Specifically, although C and B in the aforementioned metallic inclusions represent carbon and boron, the two elements may substitute for each other. For example a metallic inclusion of carbide such as $M_{23}(C, B)_6$, $M_4(C, B)$, $M_2(C, B)$, or M(C, B) and a metallic inclusion of boride such as $M_2(B, C)$ may be precipitated. Furthermore, a metallic inclusion of carbide such as $M_{23}C_6$, $M_4C$, $M_2C$, or MC and a metallic inclusion of boride such as $M_2B$ may be co-precipitated together instead of individually.

Thus, in the present invention, even though the metallic inclusion of carbide such as $M_{23}C_6$, $M_4C$, $M_2C$, or MC or the metallic inclusion of boride such as $M_2B$ may take any chemical form, these inclusions exhibiting excellent electrical conductivity are dispersed to thereby exhibit excellent performance.

In general, a bipolar plate has the below-described five functions:
  a) a function of a channel which supplies a fuel gas and an oxidizing gas uniformly in inner planes of a cell;
  b) a function of a channel which effectively discharges water formed in cathode portions to outside a fuel cell, along with a carrier gas such as air or oxygen after reaction;
  c) a function of an electrical connector between membrane electrode assemblies so as to maintain for a prolonged period of time low resistance and high conductivity suitable for an electrode;

d) a function of a separator which separates a cathode chamber and an anode chamber in adjacent assemblies; and e) a function of a separator which isolates cooling water channels and separates adjacent assemblies. In the present invention, the bipolar plate has at least the aforementioned function c).

The present inventors have conducted a variety of tests so as to develop stainless steel exhibiting low contact electrical resistance and excellent corrosion resistance, particularly stainless steel which exhibits no increase in contact electrical resistance with a graphite electrode material even when the steel serves as bipolar plates in a PEFC for a long period of time. The inventors have obtained the following findings.

a) Passive film formed on the surface of stainless steel inevitably exhibits electrical resistance. Therefore, when typical stainless steel covered with passive film serves as bipolar plates in a PEFC it is difficult to maintain the electrical resistance low so as to obtain sufficient cell performance.

b) Contact electrical resistance depends on the number of contact points per unit area; overall area of contact points; and electrical resistance of each contact point.

c) A conductive metallic inclusion of carbide and a conductive metallic inclusion of boride are dispersed and exposed such that the inclusions protrude to the surface of stainless steel from passive film, to thereby drastically lower contact electrical resistance and continuously maintain contact electrical resistance low. In this case, the conductive metallic inclusion of carbide and the conductive metallic inclusion of boride function as electric conduction paths.

d) When stainless steel is used in a PEFC, stainless steel exhibits relatively good corrosion resistance. However, metal elements are dissolved to result in corrosion, and corrosion products predominantly comprising iron hydroxide are formed, to thereby elevate contact electrical resistance and considerably affect a catalyst included in a fuel cell. Thus, cell performance represented by electromotive force is lowered within a short period of time, and proton conductivity of a proton-conductive fluoride ion-exchange membrane having a hydrogen-ion (proton)-exchange group is lowered.

e) In contrast, passive film is essential for assuring corrosion resistance of stainless steel within a PEFC. However, when the thickness of passive film is increased to thereby strengthen passive film, contact electrical resistance increases to thereby drastically lower cell efficiency.

f) In order to strengthen passive film and prevent release of metallic elements into a PEFC, the Cr content and Mo content (Cr%+3× Mo%) is preferably controlled to 13 or higher.

g) When B is added to stainless steel so as to intentionally precipitate $M_2B$ metallic inclusions of boride, Cr, Mo, Fe, and Ni serving as corrosion-resistance-enhancing elements are consumed, to thereby drastically affect corrosion resistance of a steel matrix due to a reduction in Cr and Mo concentrations. Therefore, in order to elevate the Cr and Mo concentrations in steel for strengthening passive film and to prevent release of metallic elements into a PEFC, (Cr+3Mo−2.5B) is preferably controlled to 13 or higher.

h) Stainless steel in which Cr-based carbide is precipitated can continuously maintain low contact electrical resistance, regardless of the thickness of passive film. However, the amount of C contained in Cr-based carbide precipitates and the total C content in steel preferably satisfy the following conditions:

[(C mass % precipitated as Cr-containing carbide)×100/{(total C mass % in steel)−0.0015%}]≧80 for ferritic stainless steel, and

[(C mass % precipitated as Cr-containing carbide)×100/{(total C mass % in steel)−0.012%}]≧85 for austenitic stainless steel.

i) Intentional addition of Mo results in sufficient corrosion resistance. Even though Mo dissolves to a fuel cell, Mo exhibits relatively weak effects on performance of catalysts included in an anode and a cathode. The supposed mechanism is such that released Mo forms a molybdate ion, which does not prevent proton conduction of a proton-conductive fluoride-ion-exchange membrane having a hydrogen-ion (proton)-exchange group. Similarly, W forms a tungstate ion and exhibits an effect similar to that of Mo. Furthermore, V also exhibits a similar effect.

j) In order to expose conductive metallic inclusions which are precipitated in stainless steel, a method comprising dissolving the surface of stainless steel by use of an aqueous acidic solution is preferred.

k) If stainless steel which is washed with water and dried after completion of pickling is left as is, contact electrical resistance is liable to increase with elapse of time. This is predominantly caused by oxidation due to oxygen contained in the air. Specifically, an acid remaining in microcavities formed in the pickled surface is evaporated, concentrated, and gushes out, to thereby cause corrosion. The surface of stainless steel immediately after pickling has a very thin passive film, and water molecules forming a hydrate or hydroxynium ions are attached to the surface. When such stainless steel is allowed to stand in air, water molecules are dissociated and evaporated until attaining an equilibrium state. Oxygen is then bound to water-molecule-dissociated sites, to thereby deposit corrosion products and elevate contact electrical resistance. Since such a phenomenon proceeds within several hours, contact electrical resistance increases by the time stainless steel serves as electricity-conducting elements.

l) However, when pickled stainless steel is treated with an aqueous alkaline solution, deterioration of performance is remarkably mitigated; particularly, increase in contact electrical resistance in a corrosive environment, particularly in a bipolar plate.

m) The extent of exposure and protrusion height of conductive metallic inclusions determining contact electrical resistance can be industrially controlled by means of varying the average corrosion amount (dissolution amount). Furthermore, the average corrosion amount resides within an appropriate range in which contact resistance is minimized. This is related to the number of contact points and surface roughness, which determine contact electrical resistance.

DETAILED DESCRIPTION OF THE INVENTION

Figure 1A:
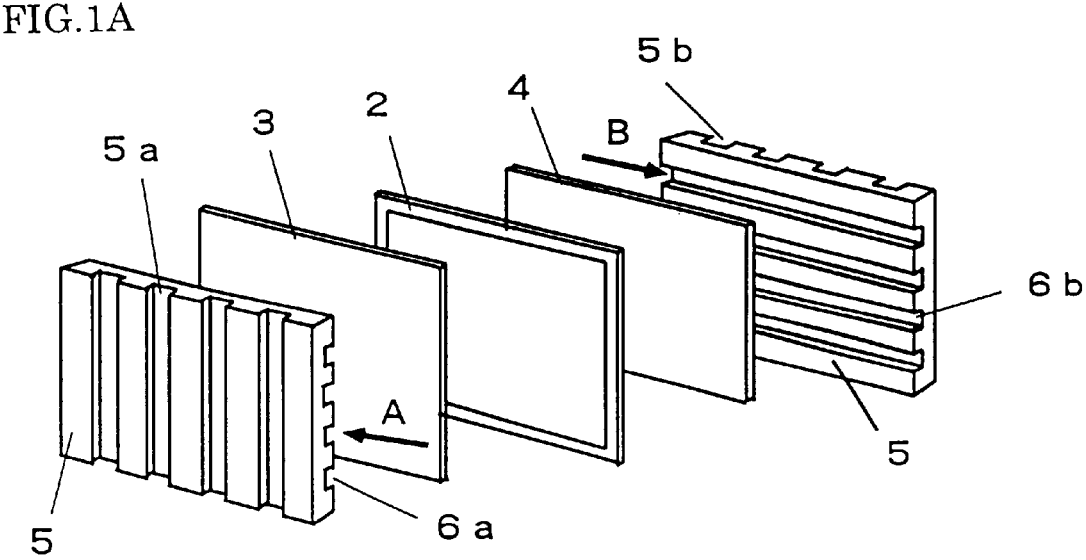
FIG. 1A shows the structure of a PEFC.

Embodiments of the present invention will next be described in detail. Hereinafter, the symbol "%" refers to "mass %."

Metallic Inclusion:

One or more types of a variety of fine metallic inclusions of carbide and boride, which inclusions are electrically conductive, are provided so as to protrude from the interior of stainless steel to the outside of a passive film through the film, which film is present on the surface of the stainless steel. Hereinafter, such a state of metallic inclusions will be referred to as "dispersion" and "exposure."

Metallic inclusions are dispersed and exposed on the surface of stainless steel in order to help the inclusions function as an electric path and reduce contact electrical resistance.

Preferable metallic inclusions of carbide include an $M_{23}C_6$ type, an $M_4C$ type, an $M_2C$ type, and an MC type, and preferable metallic inclusions of boride include an $M_2B$ type.

Generally, an $M_{23}C_6$-type metallic inclusion of carbide in stainless steel reduces corrosion resistance, and thus the inclusion is considered undesirable. However, in the present invention, an $M_{23}C_6$-type metallic inclusion of carbide, which has been considered undesirable, is precipitated in a large amount and employed as an "electrical path" which reduces contact electrical resistance which has been increased by formation of a passive film.

Of $M_{23}C_6$-type, $M_2C$-type, and MC-type metallic inclusions of carbide and an $M_2B$-type metallic inclusion of boride, a metallic inclusion containing one or more of chromium, molybdenum, and tungsten serving as a metallic element (M) is preferable, for the reasons described below. Carbides and borides of such metals are thermodynamically stable as a metallic inclusion, and, similar to matrices, exhibit high conductivity and excellent corrosion resistance. These metallic inclusions have high hardness, and thus they are preferably employed in order to attain an object in an embodiment of the present invention, in which the inclusions are pressed into the surface of stainless steel so as to remain therein, by means of machining processes such as shot blasting, polishing, or grinding, to thereby exhibit functions. In addition, even when these metallic inclusions are dissolved, dissolved metal ions are corrosion-resistance-enhancing elements for promoting passivation of stainless steel. Molybdenum and tungsten usually form metallic ions, and may form anions such as molybdate ions and tungstate ions, and thus these metals rarely affect a proton conductive membrane serving as an electrolyte membrane.

The following are methods for exposing metallic inclusions on the outer surface of a passive film formed on the surface of stainless steel:

(1) a method for pickling stainless steel in which metallic inclusions are precipitated, to thereby corrode away the surface of stainless steel;

(2) a method for rolling stainless steel by use of a roll having micro-irregularities in which the surface is subjected to machining processes such as shot blasting or etching (such a roll is called a "dull roll");

(3) a method for pressing metallic micro-powder of $B_4C$, WC, or $MO_2C$, which powder is electrically conductive, into the surface of stainless steel to remain therein, during machining of the powder such as shot blasting, polishing, or grinding;

(4) a method which combines a surface treatment method called surface modification such as deposition or ion implantation with a thermal treatment for precipitation.

Of these, a method of type (4) incurs high cost when employed industrially, but the method is effective since, except in the outermost layer, properties of stainless steel rarely vary in a thickness direction. Meanwhile, the aforementioned pickling method is suitable for producing stainless steel on an industrial scale, and the method is most preferable since it is carried out with ease. Therefore, pickling for exposing metallic inclusions will be described.

Pickling may be carried out by immersing the matrix of stainless steel in an acidic solution which can dissolve the matrix, or by electrolyzing the matrix in the solution.

Preferably, an acidic solution used in pickling corrodes the matrix of stainless steel uniformly and exclusively so that conductive metallic inclusions remain.

Examples of such acidic solutions include a nitric-hydrofluoric acid aqueous solution, a sulfuric acid aqueous solution, and a hydrochloric acid aqueous solution, which are usually used in an industrial-scale stainless steel production line. Alternatively, there may be used a commercially-available aqueous acidic solution used for etching stainless steel, which solution predominantly contains an aqueous solution of ferric chloride. If necessary, organic or inorganic additives may be added to an acidic solution in order to suppress deterioration of the solution or to make a corroded surface even and smooth.

The concentration of acidic component in an aqueous acidic solution required for pickling varies with the type of stainless steel and the temperature for pickling treatment. The temperature for pickling treatment may fall within a range of room temperature to the boiling point of the solution. The concentration and temperature may be determined by observing the corrosion state of stainless steel. The concentration and temperature are preferably regulated so as to obtain a mean mass loss of 5–60 $g/m^2$, and surface roughness; i.e., a arithmetical mean roughness (Ra), of 0.06–5 $\mu m$.

A preferable aqueous acidic solution is a nitric-hydrofluoric acid aqueous solution. The concentration of hydrofluoric acid in the solution is 2–20 mass %, the concentration of nitric acid in the solution is 5–20 mass %, and the temperature of the solution is 30–90° C. When the concentration of hydrofluoric acid or nitric acid is below the lower limit of the above range, pickling efficiency may be reduced, whereas when the concentration is in excess of the upper limit of the above range, the surface of stainless steel may be considerably roughened, to thereby increase contact electrical resistance. A nitric-hydrofluoric acid aqueous solution enables exposure of conductive metallic inclusions and passivation of the surface of matrix of stainless steel simultaneously, and thus the solution is preferable.

When a sulfuric acid aqueous solution is used, after completion of pickling, a corrosion product may adhere to the surface of stainless steel, and thus the product must be removed by use of an acid solution which dissolves the product, such as a hydrochloric acid aqueous solution. When a sulfuric acid aqueous solution is used, the concentration of the solution is 5–25 mass %.

A hydrochloric acid, which differs from a nitric acid, cannot passivate the surface of matrix of stainless steel, but when a hydrochloric acid is used, the concentration of a hydrochloric acid aqueous solution is preferably 3–15 mass %. The temperature of the above solutions is preferably regulated within a range of room temperature to 85° C. A mixture of these solutions may be used as a pickling solution, and if necessary, a commercially available inhibitor may be added to the solution in order to suppress corrosion speed.

As described above, pickling can be efficiently carried out by immersing stainless steel into an aqueous acidic solution. Alternatively, pickling may be carried out by jetting, showering, or spraying an acidic solution onto the surface of stainless steel.

In the production method of the present invention, neutralization treatment must be carried out after completion of pickling. Even when stainless steel is sufficiently washed with water after pickling, an acid component may remain in the micro-irregularities of the surface of stainless steel, in spaces between metallic inclusions and the matrix of stainless steel, and at grain boundaries. Thus, in most cases, the acid component is concentrated in accordance with drying of the surface. As a result, corrosion of the surface may proceed due to concentration and dispersion of a pickling solution, and contact resistance on the surface may increase with passage of time. However, when neutralization treatment is carried out by immersing stainless steel in an aqueous alkaline solution having a pH of 7 or higher, or by spraying such a solution onto the surface of stainless steel, deterioration of properties of stainless steel can be prevented to a considerable extent. In this case, the term "spraying" also refers to jetting or showering of an aqueous alkaline solution through a nozzle.

An aqueous alkaline solution used in the present invention preferably satisfies the following conditions: (1) water-soluble; (2) capable of being cleaned well with water after treatment; (3) waste can be easily treated on an industrial scale; and (4) easily available and inexpensive. A preferable example of such an aqueous alkaline solution is a 3–10 mass % aqueous solution of sodium hydroxide.

Figure 2:
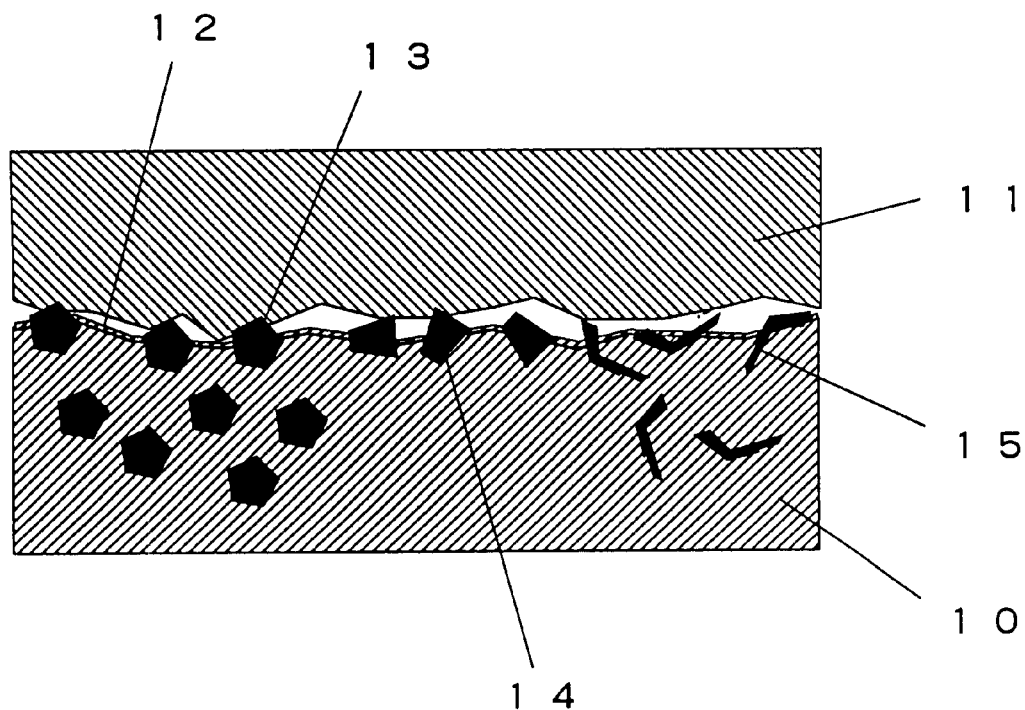
FIG. 2 shows a state in which contact is established between the surface of a stainless steel product in which metallic inclusions are exposed and a surface of another electrically conductive body.

FIG. 2 is a cross-sectional view showing the case in which the surface of a conductor is brought into contact with the surface of stainless steel of the present invention, in which metallic inclusions are exposed.

FIG. 2 shows the state in which a passive film 12 is formed on the surface of stainless steel 10, and precipitated metallic inclusions of boride 13 and metallic inclusions of carbide 15 and protruded metallic inclusions 14 are exposed on the surface of stainless steel, and these inclusions are brought into contact with a carbon plate 11.

The surface roughness of stainless steel after pickling may affect contact electrical resistance, and thus the arithmetical mean roughness of stainless steel is preferably 0.06–5 $\mu$m. When the arithmetical mean roughness (Ra) of stainless steel is less than 0.06 $\mu$m, the surface is very even, and thus even when conductive metallic inclusions are present in the vicinity of the surface, contact electrical resistance is rarely enhanced. Namely, when the surface is very even, contact points may decrease in number. In contrast, when Ra is in excess of 5 $\mu$m, contact points per unit area decrease considerably in number, and thus contact electrical resistance tends to lower. Therefore, Ra is preferably 0.06–5 $\mu$m, more preferably 0.06–2.5 $\mu$m.

The above-described surface roughness; i.e., "arithmetical mean roughness Ra," refers to a value representing the degree of two-dimensional surface roughness as defined in JIS B 0601-1982.

Figure 8:
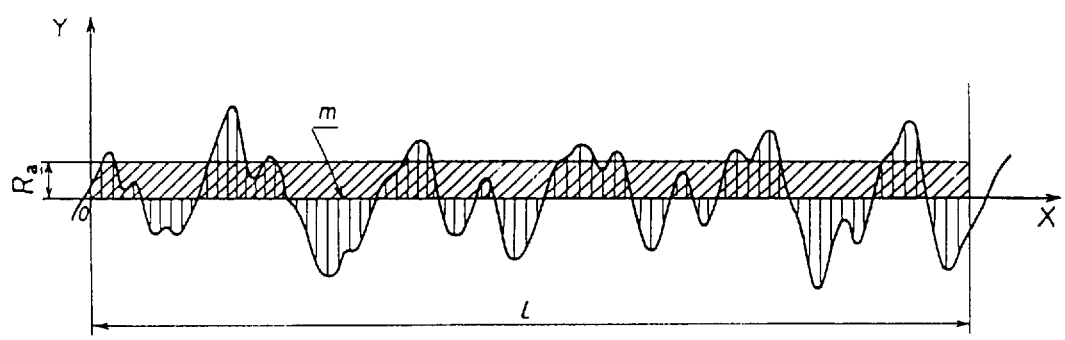
FIG. 8 is a graph for describing average surface roughness Ra as defined by JIS B0601.

As shown in FIG. 8, Ra is a value measured in micrometers ($\mu$m) and calculated through the following equation, when a portion of a roughness curve (y=f(x)) having a predetermined unit length in the direction of an average line is removed, the X axis is provided in the direction of the average line of the portion, and the Y axis is provided in the direction of the longitudinal magnification of the portion.

$$Ra = \frac{1}{l}\int_0^l |f(x)|dx \qquad (l: \text{standard length})$$

A preferable chemical composition of stainless steel of the present invention will next be described.

C:

C is an important element in the present invention, as is B. When C is dispersed and precipitated as carbide predominantly containing Cr in stainless steel, contact electrical resistance of the surface of stainless steel which is covered with a passive film may be lowered, for the reasons described below. Cr-containing carbide exhibits metallic properties, and exhibits good electrical conductivity as compared with the passive film. In B-containing stainless steel, B elements in boride may be replaced by C elements in carbide, and the carbide is precipitated.

Generally, a very thin passive film having a thickness of tens of Å is formed on the surface of stainless steel, and the film exhibits excellent corrosion resistance. However, in general, a passive film has low electrical conductivity as compared with a matrix of stainless steel, and thus the film increases contact electrical resistance. When a passive film is made thinner, electrical resistance can be lowered. However, particularly when stainless steel is employed in a PEFC, allowing a passive film to be present as a thin film of uniform thickness is difficult. When Cr-containing carbide exhibiting high electrical conductivity is not covered with a passive film but is directly exposed on the surface of the film, the electrical resistance of the surface of stainless steel is very effectively lowered for a prolonged period of time. Cr-containing carbide is stable against corrosion, and a passive film is not formed on the surface of the carbide. Therefore, even when a passive film on the surface of stainless steel is thickened in a PEFC, good conductivity is maintained by the intervention of Cr-containing carbide which is exposed on the surface of stainless steel, and thus contact electrical resistance of the surface of stainless steel can be lowered. In other words, fine Cr-containing carbide which is not covered with a passive film but is exposed on the surface of stainless steel functions as an "electrical path" (bypass), and thus contact electrical resistance can be lowered.

Generally, when stainless steel contains a large amount of C, the steel exhibits high strength and hardness and low ductility, which results in poor productivity. In order to maintain formability of stainless steel used for producing a bipolar plate for a PEFC, C in stainless steel is preferably precipitated as carbide to thereby reduce the amount of C contained in the steel. When C is precipitated as carbide, formability of stainless steel may be improved. Namely, an effective measure for maintaining formability of stainless steel is to precipitate C in the steel as carbide. In addition, formability of stainless steel is very effectively improved by converting carbide into a large coagulation through thermal treatment. When carbide is maintained for a prolonged period of time, carbide is coagulated to thereby form a large coagulation. When residual strain is applied to carbide in advance by means of cold rolling, shot blasting with metallic fine powder, polishing, or grinding before carbide is subjected to thermal treatment so as to form a large coagulation, the time of precipitation and coagulation of carbide can be shortened. In addition, even when sensitization is revealed in accordance with precipitation of carbide, corrosion resistance is immediately recovered to the level of a matrix.

In ferritic stainless steel, when C is contained in an amount in excess of 0.15%, formability of the steel used for producing a bipolar plate for a PEFC cannot be maintained, and thus C is preferably contained in an amount of 0.15% or less. In order to prevent sensitization caused by precipitation of carbide, a value obtained from the following formula is preferably 80 or more: (mass % of C precipitated as Cr-containing carbide)×100/[(total mass % of C contained in steel)−0.0015%].

In order to precipitate, disperse, and expose carbide on the surface of stainless steel, C is preferably contained in the steel in an amount of 0.01% or more, more preferably 0.04% or more. In order to accelerate precipitation of carbide, stainless steel may be subjected to thermal treatment at a temperature within a range of 500–950° C. When the treatment temperature is higher than 950° C., Cr-containing carbide becomes thermally unstable and is contained in stainless steel again. In contrast, when the treatment temperature is lower than 500° C., C and Cr in stainless steel slowly diffuse, and thus a prolonged period of time is required for precipitation in large-scale production, which is unsatisfactory from the viewpoint of industrial production. Precipitation of Cr-containing carbide is preferably carried out at a temperature within a range of 650–900° C., more preferably 800–900° C.

In austenitic stainless steel, in order to precipitate carbide in a large amount, C may be contained in an amount of 0.005–0.2%. When C is contained in an amount in excess of 0.2%, maintaining formability of stainless steel used for producing a bipolar plate for a PEFC is difficult. In order to precipitate carbide in a large amount, and to disperse and expose the carbide on the surface of stainless steel, C is preferably contained in the steel in an amount of 0.015% or more, more preferably 0.06% or more. In order to prevent sensitization caused by precipitation of carbide, a value obtained from the following formula is preferably 85 or more: (mass % of C precipitated as Cr-containing carbide)×100/((total mass % of C contained in steel)−0.012%). In order to accelerate precipitation of carbide, stainless steel may be subjected to thermal treatment at a temperature within a range of 500–950° C. When the temperature is higher than 950° C., Cr-containing carbide becomes thermally unstable and is contained in stainless steel again. In contrast, when the temperature is lower than 500° C., C and Cr in stainless steel slowly disperse, and thus a prolonged period of time is required for precipitation in large-scale production, which is unsatisfactory from the viewpoint of industrial production. Precipitation of Cr-containing carbide is preferably carried out at a temperature within a range of 600–900° C.

Cr-containing carbide disperses and precipitates finely in steel, but tends to precipitate exclusively at grain boundaries. In order to lower contact electrical resistance, Cr-containing carbide may be precipitate either at grain boundaries or in grains. However, from the viewpoint of uniform dispersion of carbide, preferably carbide also disperses in grains.

In order to disperse Cr-containing carbide in grains of stainless steel, firstly the carbide is precipitated and strain is applied to the steel by means of hot rolling or cold rolling within a certain temperature range and for a specified time such that not all of the carbide is contained in the steel again; i.e., only a portion of the carbide is contained in the steel again. Subsequently, the temperature is maintained within a temperature range in which the carbide is precipitated; i.e., 500–950° C. The effect of cold working can be confirmed by a degree of cold working on the order of several %, but the degree is preferably approximately 20–30% or more. Strain may be applied to only the vicinity of an outer layer of stainless steel, and carbide may be precipitated only in the vicinity of the outer layer. C in stainless steel, which is contained in the steel again, is re-precipitated by use of carbide remaining at grain boundaries or in grains, serving as nuclei, to thereby form another grain boundary and precipitate carbide in another grain.

In ferritic stainless steel, when strain is applied to only the vicinity of the surface and precipitation treatment is performed only in the vicinity of the surface, it becomes difficult to obtain a value of 80 or more in the following formula: (mass % of C precipitated as Cr-containing carbide)×100/((total mass % of C contained in steel)−0.0015%). Meanwhile, in austenitic stainless steel it is difficult to obtain a value of 85 or more in the following formula: (mass % of C precipitated as Cr-containing carbide)×100/((total mass % of C contained in steel)−0.012%). However, it is preferable to obtain the above values in the surface of stainless steel on which carbide is exposed.

As is known, in precipitation of Cr-containing carbide, the corrosion resistance of a matrix of stainless steel may be lowered due to sensitization. The term "sensitization" refers to lowering of corrosion resistance, which occurs by formation of a Cr-depleted zone which surrounds precipitated Cr-containing carbide. Sensitization can be avoided or mitigated by maintaining stainless steel at a temperature range between 500° C. and 950° C. for a prolonged period of time and by gradually cooling the steel. Generally, a slow cooling rate is preferable.

However, the time of thermal treatment for suppressing sensitization varies with the amount of C in stainless steel and the treatment history of the material, and it is difficult to determine the conditions for time. Namely, the conditions of thermal treatment for suppressing sensitization varies with the state of precipitation of carbide, the amount of residual strain, or the holding temperature before thermal treatment for precipitation of carbide, and thus it is difficult to determine the conditions. For example, stainless steel is cooled in a furnace at 830° C. for six hours.

Immediately after completion of precipitation and thermal treatment, without cooling, stainless steel may be successively subjected to thermal treatment for suppressing sensitization. Alternatively, after stainless steel is cooled, the steel is heated again to a temperature within a range of 500° C.–950° C., maintained at the temperature, and gradually cooled, to thereby avoid or mitigate sensitization. As a standard, in ferritic stainless steel, a value of 80 or more may be obtained in the following formula: (mass % of C precipitated as Cr-containing carbide)×100/((total mass % of C contained in steel)−0.0015%). In austenitic stainless steel, a value of 85 or more may be obtained in the following formula: (mass % of C precipitated as Cr-containing carbide)×100/((total mass % of C contained in steel)−0.012%). Whether sensitization is avoided, sensitization is recovered, and corrosion resistance is maintained in stainless steel may be easily confirmed by means of a grain-boundary-corrosion-detection method; for example, "sulfuric acid-copper sulfate corrosion test" specified by JIS G-0575.

In order to measure the value "mass % of C precipitated as Cr-containing carbide", a round bar having a diameter of 8 mm is produced from a test material, and the bar is subjected to constant current electrolysis in a non-aqueous solvent by use of an AA solvent (10% acetylacetone-1% tetramethylammonium chloride-methanol (balance)). The amount of Cr in the thus-obtained "extract residue" is quantitatively analyzed, and all Cr is assumed to be contained in $Cr_{23}C_6$, to thereby obtain the amount of C by means of equivalent calculation.

Specifically, a round bar is subjected to constant current electrolysis in an AA non-aqueous solvent at a current density of 20 mA/cm$^2$ for approximately three hours, to thereby dissolve the bar (approximately 0.4 g) in the solvent. Immediately after electrolysis, the AA non-aqueous solvent used in electrolysis and an AA non-aqueous solvent in which the electrolysis test piece is ultrasonically cleaned are filtered by use of "Nuclepore" having a filter diameter of 0.2 $\mu$m (product of Coster Scientific Corporation), and a residue on the filter is dissolved in sulfuric-phosphoric acid (high-graded phosphoric acid:high-graded sulfuric acid:distilled water=1:1:1). The thus-obtained solution is subjected to analysis of metallic component by use of an inductively-coupled plasma fluorescence spectroscopic analyzer (model: ICPV-1014, product of SHIMADZU CORPORATION), to thereby obtain the concentration of Cr in Cr-containing carbide.

Measurement of "total mass % of C contained in steel" is carried out by means of an infrared-absorbing method. Specifically, a test piece is heated and melted under flow of oxygen, and carbon in steel is sufficiently heated to form carbon dioxide. The thus-obtained carbon dioxide is conveyed to an infrared-absorbing cell together with oxygen, and the amount of carbon is measured on the basis of the infrared absorption of carbon dioxide. At the present time, this is the most common method for quantifying carbon in steel.

Si:

In stainless steel, Si is preferably contained in an amount of 0.01–1.5%. Si is an effective deoxidizing element, as is Al, in steel which is produced on an industrial scale. When the amount of Si in steel is less than 0.01%, deoxidation is insufficient, whereas when the amount is in excess of 1.5%, steel may be deteriorated in formability.

Mn:

In ferritic stainless steel, Mn is preferably contained in an amount of 0.01–1.5%. Generally, Mn exhibits effects on fixing S in steel to form an Mn-type sulfide, and effects on improving hot processability. In austenitic stainless steel, Mn is contained in an amount of 0.01–2.5%. Mn is an effective austenite-phase-stabilizing element. Mn is not necessarily contained in the steel in an amount in excess of 2.5%.

P:

The amount of P in steel is preferably 0.04% or less. In the present invention, P is considered a very harmful impurity, as is S. The lower the amount of P, the more preferable.

S:

The amount of S in steel is preferably 0.01% or less. In the present invention, S is considered a harmful impurity, as is P. The lower the amount of S, the more preferable. In accordance with the type of coexisting elements in steel and the amount of S, most S in steel is precipitated as Mn-containing sulfide, Cr-containing sulfide, Fe-containing sulfide, complex sulfide thereof, or complex non-metallic inclusion with oxide. However, in a bipolar plate for a PEFC, any compositional non-metallic sulfide inclusion acts, to some extent, as an origin of corrosion, and the inclusion becomes detrimental to maintenance of passive film and suppression of release of corrosion products. Generally, the amount of S in steel which is produced on an industrial scale is in excess of 0.005%, and approximately 0.008%. In order to prevent the aforementioned disadvantageous effects, the amount of S in steel is preferably 0.002% or less, more preferably less than 0.001%, and the lower the amount, the more preferable. In presently employed refining technique, the amount of S in steel can be reduced to less than 0.001% in industrial-scale production of steel with little rise in production cost, posing no problem.

Cr:

Cr is a very important basic alloy element for maintaining corrosion resistance of a matrix. The greater the amount of Cr in steel, the higher the corrosion resistance. In ferritic steel, when the amount of Cr is in excess of 36%, industrial-scale production of steel is difficult. In austenitic steel, when the amount of Cr is in excess of 30%, an austenite phase becomes unstable by adjustment of other alloy components. In ferritic steel, when the amount of Cr is less than 10%, it becomes difficult to maintain corrosion resistance required of steel used as a bipolar plate even if the amounts of other elements are varied. Alternatively, when the amount of Cr is less than 17% in austenitic steel, it becomes difficult to maintain corrosion resistance required of steel used as a bipolar plate even if the amounts of other elements are varied.

When boride or carbide is precipitated, the amount of Cr contained in steel, Cr contributing to enhancement of corrosion resistance, is reduced as compared with the amount of Cr contained in molten steel, and thus the corrosion resistance of a matrix may be lowered. In the case of steel of the present invention in which $M_2B$-type boride is precipitated, in order to maintain corrosion resistance of the steel in a PEFC, the amount of Cr in the steel preferably satisfies the following relation: $13 \leq (Cr\%+3\times Mo\%-2.5\times B\%) \leq 50$. Incidentally, when $M_{23}C_6$-type carbide is precipitated in steel, the amount of Cr contained in steel is lowered in accordance with the amount of precipitated carbide, and thus the amount of Cr in steel preferably satisfies the following relation: (Cr% in steel–Cr% precipitated as $M_{23}C_6$-type carbide)+$3\times Mo\% \geq 13$.

Al:

Al is added to molten steel as a deoxidizing element. When B is contained in steel of the present invention, B is strongly bonded to oxygen in molten steel, and thus the amount of oxygen in the steel may be lowered by Al-deoxidation. Therefore, Al may be contained in the steel in an amount of 0.001–6%.

B:

B is contained in steel if necessary, and when B is contained in steel, B exhibits important effects. The amount of B in steel is preferably 3.5% or less. In B-containing steel which contains Cr and Fe in a large amount and Ni and Mo in a small amount, when B is precipitated as $M_2B$-type boride such as $(Cr, Fe)_2B$ or $(Cr, Fe, Ni)_2B$, the contact electrical resistance of the surface of stainless steel which is covered with a passive film is effectively lowered. Meanwhile, when stainless steel is shot-blasted with fine particles of $B_4C$, or when B is pressed into stainless steel so as to remain therein during polishing and grinding, the contact electrical resistance of the steel is continuously maintained low.

The reason why the above-described phenomena occur is that the aforementioned borides have metallic properties, and exhibit good conductivity as compared with a passive film.

When boride having high electrical conductivity is not covered with a passive film but is directly exposed on the surface of the passive film, the electrical resistance of the surface of stainless steel is very effectively lowered for a prolonged period of time.

Boride is stable against corrosion, as is carbide, and no passive film is formed on the surface of boride. Therefore, even when a passive film on the surface of steel is thickened in a PEFC, good conductivity is maintained by the intervention of boride which is exposed on the surface of steel, and thus the contact electrical resistance of the surface of stainless steel can be lowered. In other words, fine boride having metallic properties, which boride is not covered with a passive film but is exposed on the surface of steel, functions as an "electrical path," and thus contact electrical resistance can be lowered.

Generally, when stainless steel contains a large amount of B, the steel exhibits high strength and hardness and low ductility, which results in poor productivity. In order to maintain formability of stainless steel used for producing a bipolar plate for a PEFC, B in steel is preferably precipitated as boride to thereby reduce the amount of B contained in the steel. When B is precipitated as boride, formability of steel may be improved.

Namely, an effective measure for maintaining formability of steel is to precipitate B in steel as boride. In addition, processability of steel is very effectively improved when boride is converted into a large coagulation through retention at a temperature in the vicinity of 1,200° C. for a prolonged period of time. However, the temperature is high, and thus material tends to be disadvantageously changed in shape.

Incidentally, during a production process, when hot working is carried out at a high forging ratio, boride which causes reduction in formability can be ground and finely dispersed. When boride is finely ground, deterioration of toughness can be reduced. Cold forging is also effective for finely dispersing boride.

When steel contains B in an amount in excess of 3.5%, production of steel through a conventional melting method is difficult, and formability of steel used for producing a bipolar plate for a PEFC cannot be maintained at ambient temperature. Therefore, the amount of B in steel is preferably 3.5%.

As is well known, most of B in steel is precipitated as boride. The amount of B contained in steel is approximately 0.01% or less at 1,125° C. At lower temperatures, the amount of B contained in steel is further lowered.

The precipitation temperature of boride varies with the amount thereof, and the temperature is in the vicinity of the solidification temperature of stainless steel. Once boride is precipitated, it is rarely contained in steel again. In accordance with the amount of B, the liquidus is lowered, and thus the range of forgeable temperature in hot working is disadvantageously narrowed. In addition, formability of boride is very poor, and thus, when the amount of B in steel is large and B is precipitated in a large amount, cracks in steel arise during production and processing, which results in poor productivity. However, when the amount of B in steel is 3.5%, steel can be produced on an industrial scale, although production thereof is very difficult.

When steel containing the boride is rolled, $M_2B$-type boride, which is rarely deformed when subjected to working, is ground and dispersed in a rolling direction of steel. Formability of steel depends on the state of dispersion of boride. The state of dispersion of boride in steel can be controlled by the conditions of forging, hot rolling, and cold rolling. Particularly, the state can be effectively controlled by hot rolling under high pressure or cold rolling.

When steel contains B in an amount of approximately tens of ppm, boride tends to precipitate at grain boundaries. In order to lower contact electrical resistance, boride may be precipitate either at grain boundaries or in grains. However, in order to enhance processability of steel at ambient temperature and to avoid cracks in steel, boride is preferably dispersed uniformly in steel.

When boride is precipitated in steel, the corrosion resistance of a matrix may be lowered, since Cr and Mo in the matrix are consumed during precipitation of boride. Therefore, it is very important that surplus Cr and Mo are contained in molten steel in advance in amounts corresponding to the amounts which are consumed during formation of boride, in order to reduce deterioration of corrosive resistance of steel. The effect of cooling rate is relatively small.

In order to maintain the corrosion resistance of steel in a PEFC, the following relation is preferably satisfied: $Cr\% + 3 \times Mo\% - 2.5 \times B\% \geq 13$. In this case, a coefficient corresponding to each element is obtained by experimentation.

In order to measure the amount of B in steel, a round bar having a diameter of 8 mm is produced from a test material, and the bar is subjected to constant current electrolysis in a non-aqueous solvent by use of an AA solvent (10% acetylacetone—1% tetramethylammonium chloride-methanol (balance)). The amount of B in the thus-obtained "extract residue" is quantitatively analyzed. Specifically, a round bar is subjected to constant current electrolysis in an AA non-aqueous solvent at a current density of 20 mA/cm² for approximately three hours, to thereby dissolve the bar (approximately 0.4 g) in the solvent. Immediately after electrolysis, the AA non-aqueous solvent used in electrolysis and an AA non-aqueous solvent in which the electrolysis test piece is ultrasonically cleaned are filtered by use of "Nuclepore" having a filter diameter of 0.2 $\mu$m (product of Coster Scientific Corporation). The amount of B is obtained by use of residue on the filter. When the amount of boride in steel is small and the amount of a residue on the filter is less than 40 $\mu$g, the residue is separated by distillation, and the amount of B is obtained through the Curcumin spectroscopic analysis. In contrast, when the residue is 40 $\mu$g or more, the residue is dissolved in sulfuric-phosphoric acid (high-graded phosphoric acid:high-grade sulfuric acid:distilled water= 1:1:1). The thus-obtained solution is subjected to analysis of metallic component by use of an inductively-coupled plasma fluorescence spectroscopic analyzer (model: ICPV-1014, product of SHIMADZU CORPORATION), to thereby obtain the amount of B which is precipitated as boride.

The residue obtained in the aforementioned constant current electrolysis in an AA solvent is collected on a filter as an $M_2B$ compound. The amount of elemental metal bonded to B in boride can be measured by means of the aforementioned method making use of an inductively-coupled plasma fluorescence spectroscopic analyzer. The qualitative analysis of the metal element can be carried out through X-ray diffraction.

N:

In ferritic stainless steel, N is an impurity. The amount of N in steel is preferably 0.05% or less, since N causes deterioration of toughness at ambient temperature. The lower the amount of N, the more preferable. Industrially, the amount of N in steel is preferably 0.007% or less. In austenitic stainless steel, N is an effective element serving as an austenite-forming element for regulating an austenite phase balance. However, in order to maintain processability of steel, the amount of N in steel is 0.4% or less.

Ni:

In austenitic stainless steel, Ni is a very important alloy element for stabilizing an austenite phase. Also, in ferritic stainless steel, Ni exhibits effects on improving corrosion resistance and toughness. In austenitic stainless steel, the amount of Ni is preferably 7% to 50%. When the amount is less than 7%, stabilizing an austenite phase is difficult, whereas when the amount is in excess of 50%, production of steel is difficult. In ferritic stainless steel, the amount of Ni is preferably 5% or less. When the amount is in excess of 5%, ferritic structure is difficult to form, steel is affected by other elements, and a two-phase structure of ferrite and austenite may be formed. In the two-phase structure, formability of a thin plate is anisotropic, and sufficient formability cannot be maintained in steel used for producing a bipolar plate for a PEFC.

Mo:

Even when Mo is contained in steel in a small amount as compared with Cr, Mo exhibits effects on improving corrosion resistance. If necessary, Mo may be contained in steel in an amount of 7% or less. When the amount of Mo in steel is in excess of 7%, avoiding precipitation of an intermetallic compound such as a sigma phase is difficult, and production of steel is difficult, due to embrittlement. Therefore, the amount of Ni is preferably 7% or less.

Incidentally, even when Mo in steel is dissolved by corrosion in a PEFC, the effect of Mo on performance of a catalyst supported on an anode or cathode is relatively weak, for the reasons described below. Dissolved Mo exists not as a metallic cation but as a molybdate anion, and thus rarely affects the cation conductivity of a fluorine-type ion exchange resin membrane having a proton exchange group.

Mo is a very important additive element for maintaining corrosion resistance of steel, and the amount of Mo in steel preferably satisfies the following relation: $(Cr\% + 3 \times Mo\% - 2.5 \times B\%) \geq 13$.

In steel, or on the surface of steel, Mo can be contained as $MO_2C$-type carbide; a residue after machining processing such as shot blasting, polishing, or grinding; or a precipitate. When Mo serving as a conductive metal is dispersed and exposed on the surface of stainless steel, the contact electrical resistance of the surface of stainless steel which is covered with a passive film is effectively lowered. The reason why such phenomena occur is that Mo-containing carbide exhibits metallic properties, and exhibits good conductivity as compared with a passive film. When Mo-containing carbide exhibiting high electrical conductivity is not covered with a passive film but is directly exposed on the surface of the film, the electrical resistance of the surface of stainless steel is very effectively lowered for a prolonged period of time, since fine Mo-containing carbide functions as an "electrical path."

Meanwhile, the concentration of Mo in the outer layer of stainless steel can be increased by ion injection, and Mo can be reacted with C in steel by means of thermal treatment, to thereby form $Mo_2C$ in the layer, although industrial employment of this process incurs high cost. Alternatively, the concentration of C in the outer layer of stainless steel can be increased by ion implantation, and C can be reacted with Mo in steel by means of thermal treatment, to thereby form $MO_2C$ in the layer.

Cu:

In ferritic stainless steel, if necessary, Cu may be contained in an amount of 1% or less. When the amount of Cu in steel is in excess of 1%, hot processability is lowered, and industrial-scale production of steel is difficult. In austenitic stainless steel, the amount of Cu is preferably 3% or less. Cu is an effective element for stabilizing an austenite phase, and exhibits effects on maintaining a passive state. However, in austenitic stainless steel, when the amount of Cu is in excess of 2%, hot processability is lowered, and industrial-scale production of steel is difficult.

If necessary, the following elements may be contained in ferritic stainless steel.

V:

Generally, V is contained, as an impurity, in a Cr raw material which serves an essential melting raw material during melt-production of stainless steel, and contamination of steel with V is inevitable to some extent. However, V dissolved in a bipolar plate may disadvantageously affect performance of a catalyst supported on an anode or cathode. In order to maintain properties of a PEFC, the acceptable amount of V in steel is 0.3% or less. The lower the amount of V, the more preferable.

Ti, Nb:

Ti or Nb exhibits effects on reducing deterioration of toughness of ferritic stainless steel. If necessary, each is contained in steel in an amount of $25 \times (C\% + N\%)$ or less. Even when Ti and Nb are contained in steel in combination, effects on improving toughness of steel can be obtained.

REM:

Rare Earth Elements (REM):

A rare earth element is strongly bonded with S in molten steel, and thus the element exhibits effects on eliminating poisoning with S. If necessary, the element is contained in steel in a misch-metal-like form. Even when the element is contained in steel in an amount of 0.1% or less, sufficient effects can be obtained.

Ca:

Ca is strongly bonded with S in molten steel, and thus Ca exhibits effects on eliminating poisoning with S. Even when Ca is contained in steel in an amount of 0.1% or less, sufficient effects can be obtained.

W exhibits effects on improving corrosion resistance of steel in the same way as Mo, and if necessary, W may be contained in steel. When W is contained in steel in a large amount, processability may deteriorate, and thus the amount of W is 4% or less. In the same way as Mo, even when W in steel is dissolved in a PEFC, the effect of Mo on performance of a catalyst supported on an anode or cathode is relatively weak. In addition, W rarely affects the cation conductivity of a fluorine-type ion exchange resin membrane having a proton exchange group.

The present invention will next be described in more detail by way of specific examples.

EXAMPLE 1

Each of 16 kinds of stainless steel having chemical compositions shown in Table 1 was melted in a 150-kg vacuum furnace through high frequency induction heating, and cast into ingots. A commercially available material was used for melting, and impurities in the steel were adjusted. A commercially available Fe—B ferroalloy was used for addition of boron. The steels represented by symbols from "a" to "i" and "p" are ferritic stainless steel samples, and the steel samples represented by symbols from "j" to "o" are austenitic stainless steel samples.

TABLE 1

| Steel | C | Si | Mn | P | S | Cu | Ni | Cr | Mo | V | N | Al | B | Ti, Nb | Cr + 3 Mo | (wt. %; balance: Fe) Cr + 3 Mo − 2.5 B |
|---|---|---|---|---|---|---|---|---|---|---|---|---|---|---|---|---|
| a | 0.022 | 0.10 | 0.08 | 0.012 | 0.0008 | 0.03 | 0.03 | 17.0 | 2.01 | 0.03 | 0.006 | 0.012 | — | — | 23.08 | 23.08 |
| b | 0.003 | 0.05 | 0.07 | 0.016 | 0.0008 | 0.12 | 0.10 | 19.9 | — | 0.02 | 0.002 | 4.02 | — | 0.09 Nb | 19.96 | 19.96 |
| c | 0.004 | 1.12 | 1.01 | 0.025 | 0.0008 | 0.72 | 0.08 | 18.0 | — | 0.03 | 0.001 | 0.023 | — | 0.08 Ti | 18.01 | 18.01 |
| d | 0.003 | 0.09 | 0.03 | 0.020 | 0.0008 | 0.01 | 2.01 | 29.2 | 3.96 | 0.02 | 0.005 | 0.033 | — | 0.10 Nb | 41.11 | 41.11 |
| e | 0.065 | 0.15 | 0.08 | 0.012 | 0.0006 | 0.01 | 0.05 | 17.1 | 2.02 | 0.03 | 0.015 | 0.010 | 0.0002 | — | 23.16 | 23.16 |
| f | 0.112 | 0.11 | 0.10 | 0.011 | 0.0005 | 0.05 | 0.03 | 18.8 | 2.02 | 0.02 | 0.007 | 0.021 | 0.0003 | — | 24.86 | 24.86 |
| g | 0.004 | 0.32 | 0.28 | 0.023 | 0.0011 | 0.04 | 0.02 | 18.2 | 0.99 | 0.01 | 0.008 | 0.013 | 0.67 | — | 21.17 | 19.49 |
| h | 0.003 | 0.29 | 0.29 | 0.021 | 0.0009 | 0.03 | 0.03 | 21.1 | 1.55 | 0.01 | 0.005 | 0.011 | 1.55 | — | 25.75 | 21.88 |
| i | 0.068 | 0.30 | 0.28 | 0.020 | 0.0010 | 0.02 | 0.03 | 22.3 | 1.55 | 0.01 | 0.005 | 0.013 | 2.06 | — | 26.95 | 21.80 |
| j | 0.018 | 0.81 | 1.60 | 0.026 | 0.0012 | 0.12 | 10.3 | 17.2 | 2.02 | 0.08 | 0.026 | 0.011 | 0.0002 | — | 23.26 | 23.26 |
| k | 0.012 | 0.12 | 0.16 | 0.028 | 0.0012 | 0.11 | 48.9 | 25.3 | 6.30 | 0.12 | 0.005 | 0.008 | 0.0003 | — | 44.20 | 44.20 |
| l | 0.018 | 0.42 | 1.44 | 0.012 | 0.0007 | 0.95 | 23.9 | 19.8 | 4.91 | 0.08 | 0.116 | 0.005 | 0.0005 | — | 34.50 | 34.50 |
| m | 0.082 | 0.81 | 1.51 | 0.018 | 0.0004 | 0.01 | 8.1 | 18.3 | — | 0.06 | 0.042 | 0.032 | — | — | 18.30 | 18.30 |
| n | 0.022 | 0.54 | 0.56 | 0.011 | 0.0082 | 0.12 | 8.2 | 22.2 | — | 0.08 | 0.037 | 0.025 | 1.02 | — | 22.20 | 19.65 |
| o | 0.024 | 0.55 | 1.51 | 0.016 | 0.0063 | 0.11 | 11.5 | 20.8 | 2.22 | 0.06 | 0.053 | 0.022 | 1.55 | — | 27.46 | 23.59 |
| p | 0.002 | 0.52 | 0.32 | 0.022 | 0.085 | 0.10 | 0.09 | 14.1 | — | 0.06 | 0.012 | 0.006 | 0.0005 | — | 14.10 | 14.10 |

From each ingot, a cold rolled steel sheet was produced according to the following process.

ingot→forging→machining→hot-rolling→annealing→cooling→descaling through shot blasting→pickling→cold-rolling (process annealing)→annealing→pickling Details of each process for production are as follows.
Ingot:

| [Steel] | [Ingot Shape] |
|---|---|
| a–f, p | round |
| g–i | flat square |
| j–m | round |
| n, o | flat square |

Forging (press working, heating in the air):

| [Steel] | [Heating Temperature (° C.)] | [Heating Period (hr)] | [Finished Size (mm)] | | |
|---|---|---|---|---|---|
| | | | Thickness | Width | Length |
| a–f, p | 1220 | 3 | 70 | 400 | 600 |
| g–i | 1180 | 3 | 50 | 400 | 600 |
| j–m | 1260 | 3 | 70 | 400 | 600 |
| n, o | 1180 | 3 | 50 | 400 | 600 |

Machining:

Each of the above slabs was subjected to machining in order to remove oxide scale formed on a surface and tearing formed at edges.

| [Steel] | [Finished Thickness (mm) after Machining] |
|---|---|
| a–f, p | 60 |
| g–i | 42 |
| j–m | 60 |
| n, o | 42 |

Hot-rolling:

| [Steel] | [Heating Temperature (° C.) of a slab in the air] | [Finished Thickness (mm)] |
|---|---|---|
| a–f, p | 1220 | 3.8 |
| g–i | 1180 | 2.6 |
| j–m | 1260 | 3.8 |
| n, o | 1180 | 2.6 |

After hot-rolling, all the slabs were cooled gradually, being wrapped with a heat insulating material in order to simulate a temperature hysteresis carried out immediately after finishing hot-rolling on an industrial scale.

Steel samples represented by symbols from "g" to "i", "n" and "o" contain 0.6% or more of boron. In steel samples, boron precipitates under the solidus curve, at about 1200° C. Because $M_2B$ type borides have significantly deteriorated deformability at both normal temperature and high temperature in spite of the borides being intermetallic compounds, forging and rolling were conducted while repeating reheating in the temperature range of 1000° C. to 1200° C. Since the temperature at an end of a coil is likely to lower and induce cracking, hot-rolling was conducted while the temperature of a coil end was maintained or the coil end was heated in accordance with needs.

Annealing after Hot-Rolling (in the air):

| [Steel] | [Annealing Temperature (° C.)] | [Cooling] |
|---|---|---|
| a, e, f, g, h, i, p | 840 | Air cooling |
| b | 925 | Water quenching |
| c, d | 1000 | water quenching |
| j, k, l, m, n, o | 1080 | Air cooling |

Holding time was 20 minutes in all cases.
Oxide scale formed on a surface at high temperature was removed through a shot blast method, followed by pickling.
Cold Rolling:
All the samples were finished to a thickness of 0.3 mm.
In accordance with needs, in the course of cold rolling, there were conducted annealing at temperature of 810° C. and pickling at 60° C. in 7% nitric acid or a 4% aqueous solution of hydrofuoric acid, so as to simulate ordinary conditions employed in industrial-scale production.

The cold-rolled coil was subjected to final annealing at the same temperature as employed in annealing of the aforementioned heat rolled material, to thereby obtain a test material. According to the method as described below, metallic inclusions were dispersed and exposed on a surface of a stainless steel sheet, followed by a treatment for neutralization.

Surface roughness, and the degrees of dispersion and exposure of metallic inclusions on a surface of a cold-rolled steel sheet, were varied by changing conditions in relation to pickling solution (composition of the solution, temperature), and pickling time. Employed pickling solutions were as follows.

(i) nitric acid: 15%, hydrofluoric acid: 3%, water: balance (ii) nitric acid: 10%, hydrofluoric acid: 8%, water: balance (iii) nitric acid: 10%, hydrofluoric acid: 4%, water: balance (iv) nitric acid: 8%, hydrofluoric acid: 3%, water: balance Pickling temperature was set at 60° C., where rate of corrosion is easily controlled, as was determined through examination conducted by varying temperature between room temperature and the boiling point of the solution.

Another method used for dispersing and exposing metallic inclusions on a surface of a stainless steel sheet was shot blasting with conductive hard fine powder of WC, $Mo_2C$, and $B_4C$. Shot-blasting conditions were as follows.

Fine powders used for shot blasting were all industrially produced, and the average particle size of the powder was about 200 μm. WC, $Mo_2C$, and $B_4C$ powders used for shot blasting were of high purity; specifically, 99% or more for WC, 90% or more for $Mo_2C$, and 95% or more for $B_4C$, and correspond to MC-type, $M_2C$-type, and $M_4C$-type carbide, respectively. The shot-blasting conditions were as follows.

Shot pressure: 5 kg/cm²

Shot distance: 200 mm

Shot quantity: 5 kg/min

Shot angle: 80 degrees

By use of the test pieces prepared as described above, the following tests of (1) through (4) were carried out.

(1) Test of a Stainless Steel Sheet in which Metallic Inclusions are Dispersed and Exposed Through Shot Blasting with Conductive Powder on a Cold-rolled Steel Sheet Each of cold-rolled steel sheets represented by symbols shown in Table 2 was pickled under conditions shown in the Table, washed with water, and dried. After being shot-blasted with conductive hard fine powder of WC, $Mo_2C$, or $B_4C$, each of the steel sheets was dipped in a 6% solution of sodium hydroxide (solution temperature: 25° C., pH: 9) for three minutes and subjected to ultrasonic cleaning, followed by another ultrasonic cleaning in distilled water for 15 minutes. In some comparative samples, test pieces were not subjected to neutralization treatment. The neutralization treatment and cleaning may be conducted immediately after pickling is carried out before shot treatment. After the treated steel sheet had been dried by use of a cold-air drier, the sample was subjected to measurement of surface roughness, in accordance with JIS B 0601-1982 (average roughness at a centerline: Ra, and maximum roughness: Rmax); contact electrical resistance immediately after completion of neutralization treatment; and contact electrical resistance after the steel sheet had been allowed to stand in the air for 500 hours. The results are shown in Table 2.

TABLE 2

| No. | Steel | Pickling solution | Pickling Time (min) | Amount reduced by corrosion g/m² | Conductive powder for shotting | Primary precipitate | Neutral-ization | Surface roughness (μm) Arithmetical Mean roughness Ra | Max height Rmax. | Contact electrical resistance mΩ · cm² Immediately after neutral-ization | After standing 500 hrs. | Remarks |
|---|---|---|---|---|---|---|---|---|---|---|---|---|
| 1 | a | ④ | 4 | 9.3 | WC | $M_{23}C_6$ | Yes | 0.278 | 3.646 | 8.35 | 9.12 | Present |
| 2 | a | ④ | 4 | 9.5 | WC | $M_{23}C_6$ | Yes | 0.958 | 14.209 | 8.33 | 8.96 | invention |
| 3 | a | ④ | 4 | 10.4 | WC | $M_{23}C_6$ | Yes | 1.033 | 8.610 | 8.34 | 8.78 | |
| 4 | a | ④ | 4 | 9.6 | $Mo_2C$ | $M_{23}C_6$ | Yes | 1.366 | 14.388 | 8.44 | 8.96 | |
| 5 | b | ④ | 4 | 9.4 | $Mo_2C$ | — | Yes | 1.305 | 13.232 | 7.89 | 8.22 | |
| 6 | c | ④ | 4 | 10.7 | $B_4C$ | — | Yes | 1.613 | 13.981 | 8.12 | 8.56 | |
| 7 | d | ④ | 4 | 10.6 | $B_4C$ | — | Yes | 1.659 | 13.395 | 8.23 | 8.78 | |
| 8 | e | ④ | 4 | 9.3 | WC | $M_{23}C_6$ | Yes | 0.877 | 8.057 | 8.45 | 8.92 | |
| 9 | g | ④ | 4 | 9.4 | WC | $M_2B$ | Yes | 0.9i8 | 8.431 | 8.12 | 8.90 | |
| 10 | i | ④ | 4 | 9.6 | WC | $M_{23}C_6$, $M_2B$ | Yes | 0.933 | 8.237 | 8.29 | 9.02 | |
| 11 | j | ④ | 4 | 9.3 | WC | — | Yes | 0.913 | 13.976 | 8.04 | 8.67 | |
| 12 | m | ④ | 4 | 9.4 | WC | $M_{23}C_6$ | Yes | 0.943 | 14.025 | 8.11 | 8.90 | |
| 13 | n | ④ | 4 | 8.9 | WC | $M_2B$ | Yes | 0.387 | 3.955 | 7.99 | 8.45 | |
| 14 | a | — | — | — | None | $M_{23}C_6$ | Yes | 0.03 | 2.75 | 112.8 | 156.9 | Comparative |
| 15 | a | ① | 10 | 14.2 | None | $M_{23}C_6$ | No * | 4.52 | 56.2 | 123.9 | 163.4 | examples |
| 16 | b | ④ | 4 | 9.4 | None | — * | No * | 0.01 | 0.94 | 107.9 | 157.3 | |
| 17 | c | ④ | 4 | 9.6 | None | — * | No * | 0.02 | 1.12 | 113.8 | 168.2 | |
| 18 | d | ④ | 4 | 8.8 | None | — * | No * | 0.0i | 0.46 | 127.5 | 179.3 | |
| 19 | j | ④ | 4 | 9.0 | None | — * | No * | 0.02 | 0.41 | 131.6 | 192.4 | |

Symbol "*" refers to conditions outside the scope of the present invention.
In the column labeled with "Pickling solution, ① and ④ correspond to the pickling solution conditions i) and iv), respectively, described in relation to Example 1.

In Table 2, steel sample Nos. 1 through 13 were subjected to shot blasting; and steel sample Nos. 14 through 19, which had no exposed metallic inclusions, were not subjected to shot blasting.

In order to avoid the influence attributed to $M_{23}C_6$-type conductive metallic precipitate, steel sample Nos. 5 through 7, which fall within the scope of the present invention, and comparative sample Nos. 16 through 19 had a lower carbon content.

$M_{23}C_6$-type and $M_2B$-type precipitates were confirmed through an optical microscope. Identification was carried out through analysis of diffraction images obtained under a transmission electron microscope.

Measurement of contact electrical resistance was carried out on a 0.3 mm-thick cold-rolled steel sheet which had been subjected to the above-described pickling and a 0.6 mm-thick commercially available glassy carbon plate ("SG3": product of SHOWA DENKO K.K.). A four-terminal method was used for measuring contact electrical resistance, contact area of a stainless steel test piece for evaluation being defined as 1 cm$^2$. Immediately before evaluation, the surface of a test piece was washed. Surfaces of samples which had not been pickled or shot-blasted were polished with emery paper (wet, No. 600). A load of 11.2 kg/cm$^2$ was applied for measurement of contact electrical resistance; contact electrical resistance varies with load, and it has been confirmed that an approximately constant value is obtained under application of a load of 10 kg/cm$^2$ or more.

As is clearly shown in Table 2, when conductive powder had "penetrated and remained" on the surface of a stainless steel sheet as a result of shot blasting, in every case contact electrical resistance was 8.45 mΩ·cm$^2$ or less. In contrast, in comparative samples in which a stainless steel sheet had not been shot-blasted, contact electrical resistance was as high as 107.9 mΩ·cm$^2$ or more. Sample Nos. 14 and 15 have high contact electrical resistance in spite of $M_{23}C_6$, a conductive metallic inclusion, precipitating in the steel sheets. The supposed reasons are that in sample No. 14, because arithmetical mean roughness was as low as 0.03 μm, indicating that the surface was considerably smooth, conductive inclusions did not project from the surface, and in sample No. 15, because arithmetical mean roughness was 4.54 μm and maximum roughness was as high as 56.2 μm, indicating that the surface was rough, conductive inclusions exist at low concentration at contact points, and therefore conductive inclusions did not sufficiently function as an electrical path. The arithmetical mean roughness, Ra, of a stainless steel sheet must fall within the range of 0.05–5 μm. Shot blasting is clearly one of the most effective industrial means which satisfies both the following conditions: (i) conductive powder penetrates and remains on the surface of a stainless steel sheet; and (ii) the arithmetical mean roughness Ra of a stainless steel sheet is adjusted within the range of 0.05–5 μm. Facility as an electrical path of conductive powder that penetrates and remains by virtue of shot blasting is considered not to vary with passage of time. Actually, contact electrical resistance on a surface of a steel sheet has been confirmed to exhibit approximately the same value even after elapse of 500 hours.

Also, as shown in sample Nos. 1 through 4, 8 through 10, 12, and 13, when conductive metallic inclusions such as $M_{23}C_6$ or $M_2B$ precipitate in a steel sheet, excellent contact electrical resistance is exhibited. Improved effects attributed to the two precipitates are considered to overlap.

As clearly shown in comparative sample Nos. 15 through 19, when neutralization treatment was not conducted, contact electrical resistance measured after elapse of 500 hours becomes high, and an effect of neutralization treatment is conspicuous.

(2) Test of a Stainless Steel Sheet in which Metallic Inclusions are Dispersed and Exposed by Precipitation Thereof In order to confirm an effect attributed only to precipitated metallic inclusions without shot blasting with conductive fine powder, there were used a stainless steel sheet having a comparatively high carbon content and $M_{23}C_6$ type carbide precipitates, and a stainless steel sheet having a high boron content and $M_2B$-type boride precipitates. The sheets were subjected to pickling under a variety of pickling conditions shown in Table 3, to thereby disperse and expose metallic inclusions.

After pickling, each of the steel sheets was dipped in a 6% solution of sodium hydroxide (solution temperature: 25° C., pH: 9) for three minutes and subjected to ultrasonic cleaning, followed by ultrasonic cleaning in distilled water for 15 minutes. Further, each sheet was washed in running water for 15 minutes, followed by ultrasonic cleaning in distilled water for five minutes. In some of the comparative samples, test pieces were not subjected to neutralization treatment.

As comparative samples, stainless steel sheets having a comparatively low carbon content and a comparatively low boron content or no boron were subjected to pickling under the same conditions. In the same manner as described above, after pickling treatment the cold-rolled steel sheets were subjected to measurement of surface roughness and contact electrical resistance. Contact electrical resistance was measured again after each steel sheet had been allowed to stand in the air for 500 hours. The results are shown in table 3.

TABLE 3

| No. | Steel | Pickling solution | Pickling Time (min) | Amount reduced by corrosion g/m$^2$ | Primary precipitate | Neutralization | Surface roughness (μm) Arithmetical mean roughness Ra | Max height Rmax. | Contact electrical resistance mΩ·cm$^2$ Immediately after neutralization | After standing 500 hrs. | Remarks |
|---|---|---|---|---|---|---|---|---|---|---|---|
| 20 | e | ③ | 5 | 12.3 | $M_{23}C_6$ | Yes | 0.07 | 2.75 | 15.6 | 16.1 | Present |
| 21 | e | ③ | 5 | 13.7 | $M_{23}C_6$ | Yes | 0.07 | 1.12 | 13.5 | 13.3 | invention |
| 22 | e | ③ | 5 | 12.4 | $M_{23}C_6$ | Yes | 0.07 | 1.24 | 14.5 | 15.2 | |
| 23 | f | ③ | 5 | 13.5 | $M_{23}C_6$ | Yes | 0.17 | 3.69 | 15.1 | 15.3 | |
| 24 | g | ③ | 20 | 39.8 | $M_2B$ | Yes | 1.22 | 7.64 | 14.6 | 14.9 | |
| 25 | h | ③ | 20 | 42.5 | $M_2B$ | Yes | 1.32 | 14.77 | 11.5 | 12.1 | |
| 26 | h | ③ | 20 | 40.7 | $M_2B$ | Yes | 1.23 | 9.22 | 12.2 | 12.5 | |
| 27 | i | ③ | 20 | 39.7 | $M_{23}C_6$, $M_2B$ | Yes | 1.34 | 16.29 | 10.8 | 11.0 | |
| 28 | i | ③ | 20 | 43.2 | $M_{23}C_6$, $M_2B$ | Yes | 2.00 | 18.24 | 11.8 | 11.9 | |

TABLE 3-continued

| No. | Steel | Pickling solution | Pickling Time (min) | Amount reduced by corrosion g/m² | Primary precipitate | Neutralization | Surface roughness (μm) Arithmetical mean roughness Ra | Max height Rmax. | Contact electrical resistance mΩ·cm² Immediately after neutralization | After standing 500 hrs. | Remarks |
|---|---|---|---|---|---|---|---|---|---|---|---|
| 29 | m | ③ | 20 | 41.5 | $M_{23}C_6$ | Yes | 1.90 | 16.87 | 13.4 | 13.8 | |
| 30 | n | ③ | 5 | 10.7 | $M_2B$ | Yes | 0.09 | 2.43 | 12.6 | 13.0 | |
| 31 | o | ③ | 5 | 11.2 | $M_2B$ | Yes | 0.08 | 1.88 | 11.4 | 11.7 | |
| 32 | o | ③ | 5 | 10.9 | $M_2B$ | Yes | 0.08 | 2.13 | 12.1 | 12.5 | |
| 33 | b | ③ | 5 | 12.3 | — | Yes | 0.05 | 2.87 | 128.3 | 132.7 | Comparative examples |
| 34 | c | ③ | 5 | 15.5 | —* | Yes | 0.08 | 1.93 | 115.6 | 133.2 | |
| 35 | d | ③ | 5 | 13.1 | —* | No* | 0.05 | 2.47 | 108.9 | 143.3 | |
| 36 | j | ③ | 20 | 39.4 | — | No* | 1.28 | 13.97 | 125.9 | 132.1 | |
| 37 | k | ③ | 20 | 43.2 | —* | No* | 1.90 | 17.02 | 118.7 | 143.8 | |
| 38 | l | ③ | 20 | 44.9 | —* | No* | 2.04 | 17.86 | 119.8 | 149.6 | |
| 39 | p | ③ | 20 | 37.5 | —* | No* | 1.08 | 20.06 | 101.6 | 155.4 | |

Symbol "*" refers to conditions outside the scope of the present invention.

As shown clearly in Table 3, in all the samples in which $M_{23}C_6$ and $M_2B$ type precipitates were dispersed and exposed on the surface of a steel sheet, contact electrical resistance is as low as 15.6 mΩ·cm² or less, but as shown in comparative samples, when precipitates are not dispersed and exposed on the surface of a steel sheet, contact electrical resistance is as high as 101.6 mΩ·cm² or more, even when the surface roughness of a steel sheet falls within the range defined by the present invention. The effect attributed to dispersed precipitates is significant. Improved effects attributed to $M_{23}C_6$-type carbide and $M_2B$-type borides are considered to overlap.

(3) Test of a Stainless Steel Sheet having Dispersed and Exposed Metallic Inclusions, and Surface Roughness Falling within a Wide Range As shown in Table 4, the surface roughness of each steel sheet was varied by changing pickling conditions in various manners.

After pickling, each steel sheet was dipped in a 6% solution of sodium hydroxide at a solution temperature of 25° C. for three minutes and subjected to ultrasonic cleaning, followed by ultrasonic cleaning in distilled water for 15 minutes. Further, each sheet was washed in running water for 15 minutes, followed by ultrasonic cleaning in distilled water for five minutes. In some comparative samples, test pieces were not subjected to neutralization treatment. Each test piece was subjected to measurement of surface roughness and contact electrical resistance immediately after neutralization treatment. Contact electrical resistance was measured again after the steel sheet had been allowed to stand in the air for 500 hours. The results are presented in table 4.

TABLE 4

| No. | Steel | Pickling solution | Pickling Time (min) | Amount reduced by corrosion g/m² | Primary precipitate | Neutralization | Surface roughness (μm) Arithmetical mean roughness Ra | Max height Rmax. | Contact electrical resistance mΩ·cm² Immediately after neutralization | After standing 500 hrs. | Remarks |
|---|---|---|---|---|---|---|---|---|---|---|---|
| 40 | e | ③ | 20 | 39.4 | $Cr_{23}C_6$ | Yes | 1.06 | 18.08 | 13.6 | 14.2 | Present invention |
| 41 | e | ③ | 30 | 49.5 | $Cr_{23}C_6$ | Yes | 2.66 | 19.76 | 12.9 | 13.9 | |
| 42 | h | ② | 15 | 50.2 | $Cr_2B$ | Yes | 2.84 | 20.12 | 13.2 | 14.2 | |
| 43 | h | ② | 30 | 44.7 | $Cr_2B$ | Yes | 3.02 | 21.59 | 12.7 | 13.7 | |
| 44 | i | ③ | 30 | 49.5 | $Cr_2B, Cr_{23}C_6$ | Yes | 1.86 | 16.33 | 12.9 | 13.5 | |
| 45 | i | ② | 30 | 50.2 | $Cr_2B, Cr_{23}C_6$ | Yes | 3.73 | 21.36 | 13.1 | 14.2 | |
| 46 | m | ③ | 20 | 35.7 | $Cr_{23}C_6$ | Yes | 1.13 | 17.17 | 13.3 | 13.7 | |
| 47 | o | ② | 15 | 40.1 | $Cr_2B$ | Yes | 2.83 | 19.24 | 12.6 | 13.5 | |
| 48 | e | ④ | 4 | 9.3 | $Cr_{23}C_6$ | Yes | 0.02 | 0.46 | 65.9 | 69.2 | Comparative examples |
| 49 | e | ④ | 4 | 8.7 | $Cr_{23}C_6$ | Yes | 0.02 | 0.45 | 87.2 | 90.1 | |
| 50 | h | ④ | 4 | 9.2 | $Cr_{23}C_6$ | Yes | 0.02 | 0.50 | 78.3 | 81.4 | |
| 51 | h | ④ | 4 | 9.4 | $Cr_{23}C_6$ | No* | 0.02 | 0.52 | 45.3 | 123.1 | |
| 52 | i | ④ | 4 | 8.7 | $Cr_{23}C_6, Cr_{23}C_6$ | No* | 0.02 | 0.43 | 68.3 | 146.7 | |
| 53 | m | ④ | 4 | 9.3 | $Cr_{23}C_6$ | No* | 0.02 | 0.40 | 89.2 | 153.5 | |
| 54 | o | ② | 30 | 87.5 | $Cr_2B$ | No* | 4.35 | 56.94 | 121.5 | 162.1 | |

Symbol "*" refers to conditions outside the scope of the present invention.

As shown in Table 4, in some cases, even though $M_{23}C_6$ and $M_2B$ types precipitates were dispersed and exposed on a surface of a stainless steel sheet, contact electrical resistance becomes high, because of the surface roughness.

This means that contact is not provided on the entire surface area of a steel sheet and thus, even though a surface is considerably smooth, contact is provided only at several points. In other words, when the surface of a steel sheet is considerably smooth, contact points are few and there is not obtained sufficient contact through conductive metallic inclusions which are exposed on the surface of a steel sheet, resulting in high contact electrical resistance.

Figure 3:
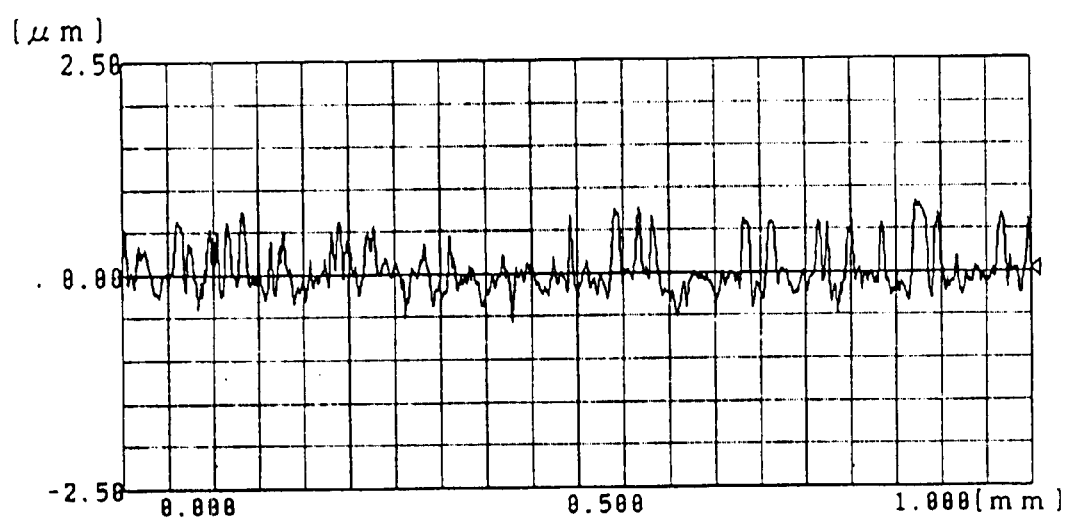
FIG. 3 is a graph showing a two-dimensional surface roughness profile of a pickled stainless steel sheet.
Figure 4:
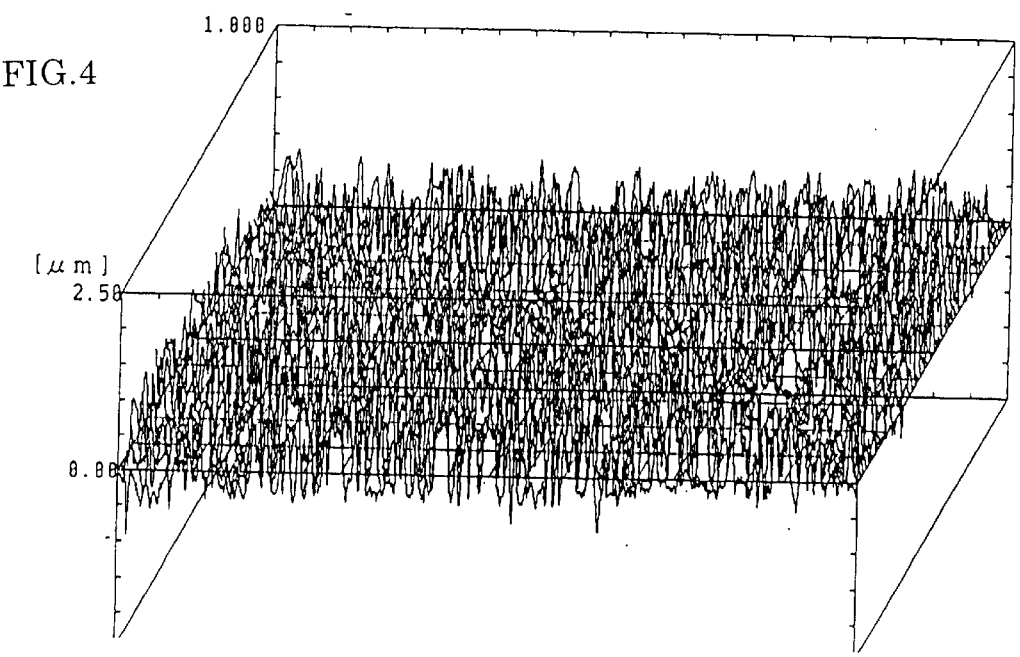
FIG. 4 is a graph showing a three-dimensional surface roughness profile of a pickled stainless steel sheet.

FIGS. 3 and 4 show surface roughness of a steel represented by symbol "n" (Table 1) which had been polished with emery paper (wet, No. 600), as measured after pickling in 10% nitric acid-3% hydrofluoric acid for five minutes. FIG. 3 shows two-dimensional measurement results, and FIG. 4 shows three-dimensional measurement results. Ra was 0.2133 $\mu$m in FIG. 3 and 0.2147 $\mu$m in FIG. 4. A commercially available roughness gauge was used.

Figure 5A:
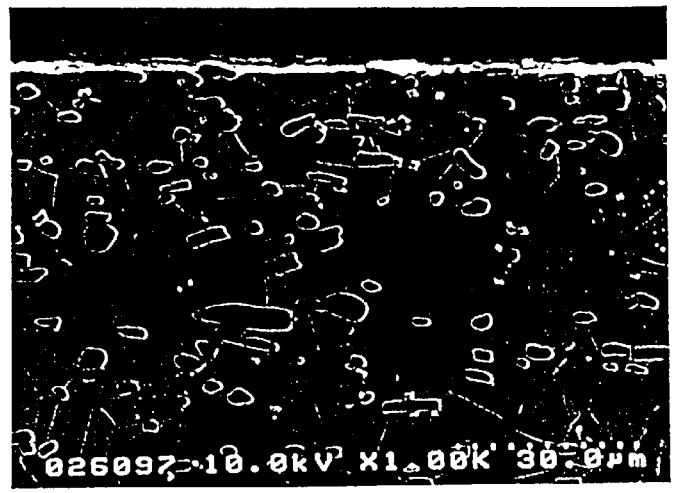
FIG. 5A is a microphotograph showing $M_2B$ metallic inclusions of boride exposed on the surface of stainless steel, and FIG. 5B a microphotograph showing $M_{23}C_6$ metallic inclusions of carbide exposed on the surface of stainless steel.

FIG. 5A is a microphotograph (×1000) of a steel sheet represented by symbol "n" (in Table 1). $M_2B$-type boride in a dispersion phase is shown thereon by enclosure with a white line. The microphotograph shows the cross section of a steel sheet observed under a Scanning Electron Microscope, and it can be observed that $M_2B$-type precipitates are dispersed on the surface, where they project upward.

Figure 5B:
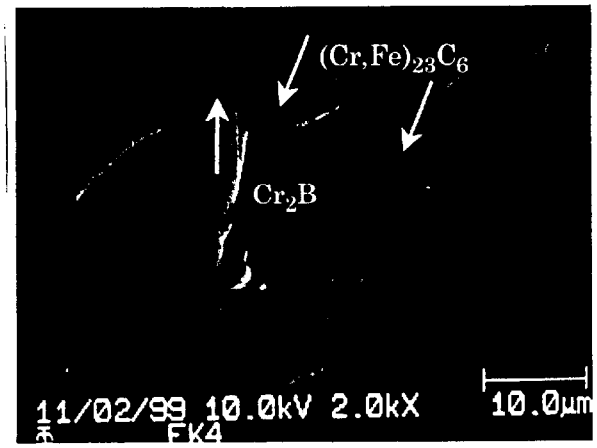

FIG. 5B is a microphotograph (×2000) of a steel sheet represented by symbol "o" in Table 1. $M_{23}C_6$-type carbide precipitates are observed on the surface of $M_2B$-type boride precipitates.

(4) Test of a Separator Made of Stainless Steel on Which Metallic Inclusions are Dispersed and Exposed, the Separator being Mounted in a Polymer-type Fuel Cell In order to evaluate the performance of a separator which is made of the stainless steel of the present invention and is mounted in a polymer-type fuel cell, a corrugated separator plate was produced from a cold-rolled steel sheet which had been subjected to final annealing. Each sheet is made of a steel represented by a symbol shown in Table 5.

Figure 1B:
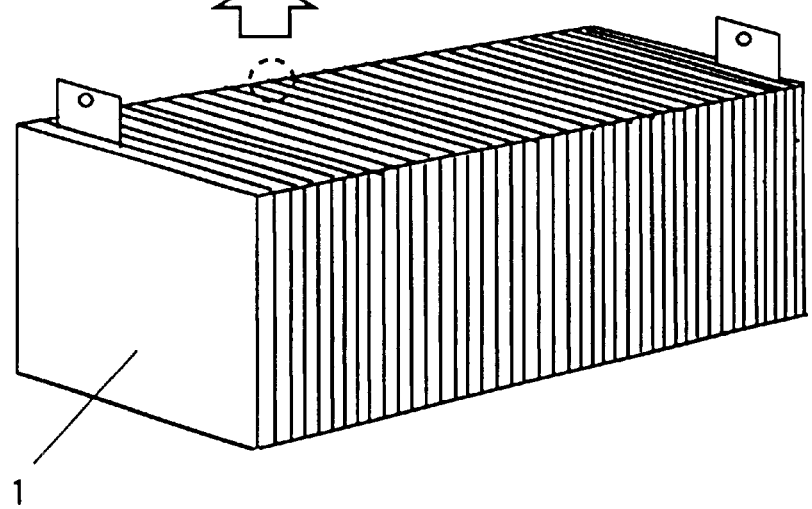
FIG. 1B shows the overall structure of a PEFC.

A separator plate has a shape shown in FIG. 1. On both side (an anode electrode side, a cathode electrode side) is provided a separator plate having a gas flow channel (channel width: 2 mm; channel depth: 1 mm) which had been cut by means of machining, and had been subjected to electric discharge. Evaluation was conducted in a state such that a separator plate was mounted inside a PEFC membrane electrode assembly. Upon elapse of one hour after introduction of fuel gas in a cell, the membrane electrode assembly voltage was measured, and by comparison with the initial voltage, the voltage drop ratio was examined for an evaluation of performance. The voltage drop ratio was calculated according to the following formula: 1—(voltage measured after elapse of 1 hour/initial voltage).

The evaluation employed a PEFC membrane electrode assembly remodeled from a commercially available cell (FC50; product of Electrochem, USA).

Hydrogen gas of 99.9999% purity was used as fuel on an anode, and air was employed as a cathode gas. The entire cell was maintained at a temperature of 78±2° C., and humidity inside the cell was controlled at a gas input side, on the basis of measurement of water content of an exhaust gas at a gas output side of the cell. The pressure inside the cell was one atmosphere. Introduction pressure of hydrogen gas and air into a cell was adjusted within the range of 0.04–0.20 bar. When a specific level of 500±20 mA/cm²—0.62±0.04 V was confirmed, measurement was continuously carried out, to thereby evaluate cell performance.

A fuel cell measuring system remodeled from an 890 series product (SCRIBNER ASSOCIATES Inc., USA) was used for measuring membrane electrode assembly performance. Driving conditions of a cell are considered to influence cell performance. Comparative evaluations were conducted under the same conditions. The results are shown in Table 5.

As shown clearly in Table 5, the stainless steel of the present invention could maintain contact electrical resistance low even when used as material for a separator mounted in a PEFC.

TABLE 5

| No. | Steel | Pickling solution | Pickling Time (min) | Conductive powder for shotting | Primary precipitate | Surface roughness Arithmetical mean roughness Ra ($\mu$m) | Evaluation conducted when a separator plate was mounted inside a PEFC membrane electrode assembly (n = 3) Voltage drop ratio in membrane electrode assembly after elapse of 1 hour: 1 − {V (after passage of time)/ V (initial)} | Remarks |
|---|---|---|---|---|---|---|---|---|
| 55 | b | ④ | 4 | WC | — | 0.984 | <0.03 | Present |
| 56 | b | ④ | 4 | $Mo_2C$ | — | 1.305 | <0.03 | invention |
| 57 | c | ④ | 4 | $B_4C$ | — | 1.613 | <0.03 | |
| 58 | e | ④ | 4 | WC | $M_{23}C_6$ | 0.877 | <0.03 | |
| 59 | g | ④ | 4 | WC | $M_2B$ | 0.918 | <0.03 | |
| 60 | i | ④ | 4 | WC | $M_{23}C_6$, $M_2B$ | 0.933 | <0.03 | |
| 61 | j | ④ | 4 | WC | — | 0.913 | <0.03 | |
| 62 | m | ④ | 4 | WC | $M_{23}C_6$ | 0.943 | <0.03 | |
| 63 | n | ④ | 4 | WC | $M_2B$ | 0.387 | <0.03 | |
| 64 | e | ③ | 5 | — | $Cr_{23}C_6$ | 0.07 | <0.05 | |
| 65 | f | ③ | 5 | — | $Cr_{23}C_6$ | 0.17 | <0.05 | |
| 66 | g | ③ | 20 | — | $Cr_2B$ | 1.22 | <0.05 | |
| 67 | h | ③ | 20 | — | $Cr_2B$ | 1.23 | <0.03 | |
| 68 | i | ③ | 20 | — | $Cr_{23}C_6$, $Cr_2B$ | 1.34 | <0.03 | |
| 69 | i | ② | 15 | — | $Cr_{23}C_6$, $Cr_2B$ | 1.98 | <0.03 | |
| 70 | m | ③ | 20 | — | $Cr_{23}C_6$ | 1.90 | <0.05 | |
| 71 | o | ③ | 5 | — | $Cr_2B$ | 0.08 | <0.03 | |
| 72 | a | — | — | None | —* | 0.03 | >0.8 | Comparative |
| 73 | b | ④ | 4 | None | —* | 0.01 | >0.8 | examples |
| 74 | c | ④ | 4 | None | —* | 0.02 | >0.8 | |

TABLE 5-continued

| No. | Steel | Pickling solution | Pickling Time (min) | Conductive powder for shotting | Primary precipitate | Surface roughness Arithmetical mean roughness Ra (μm) | Evaluation conducted when a separator plate was mounted inside a PEFC membrane electrode assembly (n = 3) Voltage drop ratio in membrane electrode assembly after elapse of 1 hour: 1 − {V (after passage of time)/ V (initial)} | Remarks |
|---|---|---|---|---|---|---|---|---|
| 75 | d | ④ | 4 | None | —* | 0.01 | >0.8 | |
| 76 | j | ④ | 4 | None | —* | 0.05 | >0.8 | |
| 77 | b | ③ | 5 | None | —* | 0.08 | >0.8 | |
| 78 | c | ③ | 5 | None | —* | 0.05 | >0.8 | |
| 79 | d | ③ | 5 | None | —* | 0.05 | >0.8 | |
| 80 | j | — | — | None | —* | 0.03 | >0.8 | |
| 81 | k | ③ | 20 | None | —* | 1.90 | >0.8 | |
| 82 | l | ③ | 20 | None | —* | 2.04 | >0.8 | |
| 83 | p | ③ | 20 | None | —* | 1.08 | >0.8 | |

Symbol "*" refers to conditions outside the scope of the present invention.
In the column labeled with "Pickling solution, ②, ③, and ④ correspond to the pickling solution conditions ii), iii), and iv), respectively, described in relation to Example 1.
Symbol "—" refers to a surface polished by use of #600 Emergy under wet conditions.

EXAMPLE 2

Effects of the present invention will become apparent from the following working Examples.

Each of 21 ferritic stainless steel samples having chemical compositions shown in Table 6 was melted in a 150-kg vacuum melting furnace through high-frequency induction heating. Commercially available raw materials were used to produce a melt, and the amounts of impurities in the steel were adjusted.

Each stainless steel was cast into ingots having a circular cross-section. The ingots were heated at 1280° C. for three hours in air and hot-forged by means of a press-forging machine. The two types of slabs for testing having the following dimensions were produced from the ingots:

(1) thickness of 30 mm, width of 100 mm, length of 120 mm, and
(2) thickness of 70 mm, width of 380 mm, length of 550 mm.

The slab (1) was hot-rolled to a steel sheet having a thickness of 6 mm, and the steel sheet was slowly cooled under thermal insulator rolling conditions which simulated a temperature hysteresis carried out immediately after hot rolling during actual production. Subsequently, the hot-rolled steel sheet was maintained in a heating furnace (constant 800° C., under air) for 16 hours, and annealed in the furnace over 48 hours, to thereby prepare a sample (hereinafter referred to as material A).

The slab (2) was subjected to machining so as to remove oxide scale, to thereby prepare a slab having a thickness of 62 mm. The slab was heated at 1200° C. in air, and hot-rolled to thereby prepare a steel sheet having a thickness of 4 mm. In a manner similar to treatment of slab (1), the steel sheet was slowly cooled under thermal insulator rolling conditions which simulated a temperature hysteresis carried out immediately after hot rolling during actual production. Subsequently, the hot-rolled steel sheet was maintained in a

TABLE 6

(wt. %; balance: Fe)

| No. | C | Si | Mn | P | S | Cu | Ni | Cr | Mo | V | N | Al | W | Cr + 3 Mo | |
|---|---|---|---|---|---|---|---|---|---|---|---|---|---|---|---|
| 1 | 0.068 | 0.06 | 0.07 | 0.011 | 0.0008 | 0.01 | 0.08 | 16.6 | — | 0.05 | 0.005 | 0.01 | — | 16.6 | Present |
| 2 | 0.065 | 0.11 | 0.08 | 0.011 | 0.0007 | 0.08 | 0.06 | 16.8 | 0.99 | 0.06 | 0.005 | 0.01 | — | 19.77 | invention |
| 3 | 0.066 | 0.15 | 0.06 | 0.010 | 0.0008 | 0.01 | 0.05 | 16.9 | 2.01 | 0.08 | 0.005 | 0.05 | — | 22.93 | |
| 4 | 0.065 | 0.15 | 0.08 | 0.012 | 0.0006 | 0.0i | 0.05 | 17.1 | 4.05 | 0.05 | 0.005 | 0.01 | — | 29.25 | |
| 5 | 0.066 | 0.12 | 0.09 | 0.011 | 0.0008 | 0.08 | 0.04 | 16.9 | 5.82 | 0.05 | 0.005 | 0.01 | — | 34.36 | |
| 6 | 0.101 | 0.15 | 0.08 | 0.012 | 0.0006 | 0.01 | 0.08 | 19.2 | — | 0.08 | 0.005 | 0.01 | — | 19.2 | |
| 7 | 0.100 | 0.06 | 0.08 | 0.010 | 0.0006 | 0.05 | 0.05 | 19.3 | 1.02 | 0.05 | 0.006 | 0.01 | — | 22.36 | |
| 8 | 0.102 | 0.10 | 0.08 | 0.011 | 0.0007 | 0.05 | 0.04 | 18.9 | 2.01 | 0.03 | 0.005 | 0.01 | — | 24.93 | |
| 9 | 0.102 | 0.09 | 0.10 | 0.012 | 0.0008 | 0.06 | 0.03 | 19.1 | 2.98 | 0.06 | 0.005 | 0.01 | — | 28.04 | |
| 10 | 0.126 | 0.11 | 0.09 | 0.010 | 0.0008 | 0.01 | 0.10 | 22.1 | 1.80 | 0.07 | 0.005 | 0.01 | — | 22.1 | |
| 11 | 0.125 | 0.10 | 0.10 | 0.009 | 0.0009 | 0.12 | 0.12 | 30.1 | 1.82 | 0.06 | 0.006 | 0.01 | — | 30.1 | |
| 12 | 0.082 | 0.51 | 0.48 | 0.027 | 0.0012 | 0.78 | 0.69 | 18.3 | 1.82 | 0.03 | 0.012 | 0.12 | 1.23 | 23.76 | |
| 13 | 0.008* | 0.48 | 0.18 | 0.027 | 0.0123* | 0.010 | 0.01 | 16.7 | — | 0.12 | 0.006 | 0.01 | — | 16.7 | Comparative |
| 14 | 0.008* | 0.28 | 0.09 | 0.029 | 0.0113* | 0.010 | 0.04 | 16.6 | 1.02 | 0.12 | 0.006 | 0.01 | — | 19.66 | examples |
| 15 | 0.008* | 0.26 | 0.45 | 0.028 | 0.0085 | 0.009 | 0.09 | 16.8 | 2.00 | 0.11 | 0.006 | 0.01 | — | 22.8 | |
| 16 | 0.042 | 0.46 | 0.37 | 0.037* | 0.0068 | 0.010 | 0.01 | 16.8 | — | 0.13 | 0.015 | 0.09 | — | 16.6 | |
| 17 | 0.040 | 0.30 | 0.45 | 0.028 | 0.0065 | 1.25* | 0.12 | 16.7 | 7.02* | 0.11 | 0.017 | 0.01 | — | 37.76 | |
| 18 | 0.008* | 0.35 | 0.08 | 0.037* | 0.0058 | 0.007 | 1.08* | 29.2 | 5.01 | 0.11 | 0.005 | 0.01 | — | 44.23* | |
| 19 | 0.007* | 0.05 | 0.22 | 0.025 | 0.0068 | 0.12 | 0.03 | 21.9 | 1.82 | 0.08 | 0.003 | 0.11 | — | 21.9 | |
| 20 | 0.009* | 0.08 | 0.21 | 0.028 | 0.0088 | 0.11 | 0.04 | 30.2 | 1.81 | 0.08 | 0.003 | 0.12 | — | 30.2 | |
| 21 | 0.008* | 0.10 | 0.12 | 0.020 | 0.0021 | 0.08 | 0.02 | 9.5* | — | 0.04 | 0.003 | 0.03 | 1.25 | 9.5* | |

Symbol "*" refers to conditions outside the scope of the present invention.

heating furnace (constant 800° C., under air) for 16 hours, and annealed in the furnace over 48 hours. The resultant steel sheet was pickled and cold-rolled by means of a cold-roller, to thereby prepare a cold-rolled sheet having a thickness of 0.3 mm (hereinafter referred to as material B).

From each of the hot-rolled steel sheet (material A) and the cold-rolled steel sheet (material B), test pieces were produced; i.e., (1) test pieces for measuring contact electrical resistance; (2) test pieces for forming a bipolar plate of a PEFC; (3) grain boundary corrosion test pieces; and (4) test pieces for measuring the C content. Each test piece was subjected to Cr carbide-precipitation treatment under the columns labeled "final heat treatment conditions" in Tables 7 and 8, and subjected to one or more of the above tests. Features of test pieces and test conditions are described as follows. When a bipolar plate was produced from material B, Cr carbide-precipitation treatment was carried out before the material was cold-rolled into a bipolar shape.

(1) Measurement of contact electrical resistance Dimensions of test pieces: thickness 3 mm or 0.3 mm; width 40 mm; length 40 mm Contact electrical resistance was measured in the following manner. Each test piece was brought into contact (contact area 1 cm$^2$) with a commercially available glassy carbon sheet having a thickness of 0.6 mm and serving as an electrode. The resistance was measured through a four-terminal method. Measurement was carried out two different sites for each test piece. The surface of the test piece was polished by use of emery paper (wet, No. 600) and washed immediately before measurement. A load of 12 kg/cm$^2$ was applied. Although the contact electrical resistance varied with the load, the resistance became almost constant when the load was regulated to 12 kg/cm$^2$.

(2) Evaluation of characteristics of a bipolar plate incorporated into a PEFC

The bipolar plates produced from materials A and B and subjected to the evaluation have the following characteristics.

a) Shape of bipolar plates
From material A
thickness 5 mm, length 80 mm×width 80 mm
gas channels: height 0.8 mm, interval between ridges 1.2 mm (discharge process)
From material B
thickness 0.3 mm, length 80 mm×width 80 mm
gas channels: height 0.8 mm, interval between ridges 1.2 mm (corrugated)

b) Surface finishing of bipolar plates
The finishing treatment involved the steps of: mechanically polishing a surface by use of SiC grinding particles for shot blasting; washing in a 5% HNO$_3$, 3% HF solution at 40° C. for 15 minutes under application of ultrasound; neutralizing with an alkali; degreasing immediately before testing, by spraying a 6% aqueous solution of sodium hydroxide; pre-washing with flow of water; soaking three times in a batch tank containing distilled water for washing; spraying distilled water for four minutes of washing; and drying with unheated air by means of a drier.

Characteristics of a bipolar plate incorporated into a membrane electrode assembly of a PEFC were evaluated by measuring the voltage of a membrane electrode assembly one hour after a fuel gas was introduced into the fuel cell and comparing the voltage with the initial voltage, to thereby obtain the voltage drop ratio, which was calculated by the following formula: 1—(voltage one hour after V/initial voltage V).

A commercially available fuel cell (Cell FC50, product of Electrochem (US)) was modified, to thereby serve as a PEFC employed in the evaluation. Hydrogen (99.9999% purity) was employed as a fuel gas in an anode, while air was employed as a cathode gas. The entire cell was maintained at 78±2° C., and the humidity in the cell was controlled at an input portion of the cell on the basis of measurement of the water content of exhaust gas in an output portion thereof. The pressure inside the cell was 1 atm. The pressure of hydrogen and air fed into the cell was controlled to 0.04–0.20 bar. When a specific level of 500±100 mA/cm$^2$— 0.62±0.03 V was confirmed, measurement was continuously carried out, to thereby evaluate cell performance.

A system for measuring characteristics of a fuel cell, based on a commercially available system (Series 800, product of SCRIBNER ASSOCIATES Inc.), was modified, to thereby serve as a system for measuring characteristics of a membrane electrode assembly. Since the characteristics seemed to vary depending on operational conditions of the cell, measurement was carried out under the same conditions.

(3) Intergranular Corrosion Test
Intergranular corrosion resistance was investigated on the basis of the Strauss test. A sulfuric acid-Copper sulfate corrosion test was carried out in accordance with JIS G 0575.

(4) Analysis of C Content
Cr carbide was caused to precipitate in materials A and B. Test pieces for analysis were prepared by cutting the materials. The amount of C contained in precipitated Cr-containing carbide and the total amount of C in steel were obtained in the following manner. The I values obtained from the results are shown in Tables 7 and 8.

TABLE 7

| Steel No. | Contact electrical resistance with respect to a carbon plate ($\Omega \cdot cm^2$) Static load applied: 12 kg/cm$^2$ Contact area of a test piece: 1 cm$^2$ Surface of a test piece: Polished with #600 Emery | Evaluation conducted when a separator plate was mounted inside a PEFC membrane electrode assembly Voltage drop ratio in membrane electrode assembly after elapse of 1 hour: 1 − {V (after passage of time)/V (initial)} | I value of tested materials: I value = (wt. % of C precipitated as Cr-containing carbide) × 100/{(wt. % of the entirety of C contained in steel) − 0.012%} | Resistance to intergranular corrosion (Strauss test). | Final heat treatment conditions ||| | Remarks |
|---|---|---|---|---|---|---|---|---|---|
| | | | | | Material type | Temperature (° C.) | Time | Cooling | |
| 1 | 0.18, 0.20 | <0.05 | 102 | No crack | A | 600 | 2 h | FC | Present invention |
| 2 | 0.17, 0.18 | <0.05 | 102 | No crack | A | 630 | 8 h | FC | invention |

TABLE 7-continued

| Steel No. | Contact electrical resistance with respect to a carbon plate (Ω · cm²) Static load applied: 12 kg/cm² Contact area of a test piece: 1 cm² Surface of a test piece: Polished with #600 Emery | Evaluation conducted when a separator plate was mounted inside a PEFC membrane electrode assembly Voltage drop ratio in membrane electrode assembly after elapse of 1 hour: 1 − {V (after passage of time)/V (initial)} | I value of tested materials: I value = (wt. % of C precipitated as Cr-containing carbide) × 100/ {(wt. % of the entirety of C contained in steel) − 0.012%} | Resistance to intergranular corrosion (Strauss test). | Final heat treatment conditions ||||  Remarks |
|---|---|---|---|---|---|---|---|---|---|
| | | | | | Material type | Temperature (° C.) | Time | Cooling | |
| 3 | 0.20, 0.18 | <0.05 | 102 | No crack | A | 680 | 4 h | FC | |
| 4 | 0.21, 0.19 | <0.05 | 102 | No crack | A | 900 | 24 h | FC | |
| 5 | 0.17, 0.18 | <0.05 | 100 | No crack | A | 910 | 4 m | FC | |
| 6 | 0.13, 0.15 | <0.05 | 100 | No crack | B | 660 | 16 h | FC | |
| 7 | 0.14, 0.15 | <0.05 | 101 | No crack | B | 900 | 8 h | FC | |
| 8 | 0.14, 0.12 | <0.05 | 100 | No crack | B | 650 | 24 h | FC | |
| 9 | 0.16, 0.18 | <0.05 | 100 | No crack | B | 570 | 60 h | FC | |
| 10 | 0.15, 0.13 | <0.05 | 101 | No crack | A | 900 | 4 h | FC | |
| 11 | 0.16, 0.14 | <0.05 | 101 | No crack | A | 900 | 2 h | FC | |
| 12 | 0.20, 0.21 | <0.05 | 101 | No crack | A | 900 | 8 m | FC | |
| 1 | 0.38, 0.38 | 0.4–0.8 | 58 * | Through-crack | A | 960 | 2 h | WQ | Comparative examples |
| 2 | 0.43, 0.41 | 0.6–0.8 | 62 * | Through-crack | A | 960 | 2 h | WQ | |
| 2 | 0.76, 0.65 | 0.6–0.9 | 76 * | Through-crack | A | 960 | 2 h | OQ | |
| 2 | 0.88, 0.92 | >0.8 | 66 * | Through-crack | B | 960 | 1 h | WQ | |
| 2 | 0.96, 1.12 | >0.8 | 78 * | Through-crack | B | 960 | 20 m | OQ | |
| 3 | 0.56, 0.63 | 0.4–0.6 | 65 * | Through-crack | A | 960 | 3 m | WQ | |
| 4 | 0.39, 0.33 | 0.4–0.8 | 76 * | Through-crack | A | 960 | 6 h | OQ | |
| 5 | 0.55, 0.58 | 0.3–0.7 | 67 * | Through-crack | A | 960 | 6 h | OQ | |
| 6 | 0.41, 0.42 | 0.4–0.8 | 72 * | Through-crack | B | 980 | 6 h | OQ | |
| 7 | 0.39, 0.41 | 0.4–0.8 | 76 * | Through-crack | B | 980 | 3 m | OQ | |
| 8 | 0.33, 0.35 | 0.2–0.6 | 74 * | Through-crack | B | 980 | 3 m | AC | |
| 9 | 0.36, 0.41 | 0.2–0.6 | 76 * | Through-crack | B | 980 | 3 m | AC | |

Symbol "*" refers to conditions outside the scope of the present invention.
WQ: Water quenching,
OQ: Oil quenching,
AC: Air cooling,
FC: Furnace cooling

TABLE 8

| Steel No. | Contact electrical resistance with respect to a carbon plate (Ω · cm²) Static load applied: 12 kg/cm² Contact area of a test piece: 1 cm² Surface of a test piece: Polished with #600 Emery | Evaluation conducted when a separator plate was mounted inside a PEFC membrane electrode assembly Voltage drop ratio in membrane electrode assembly after elapse of 1 hour: 1 − {V (after passage of time)/V (initial)} | I value of tested materials: I value = (wt. % of C precipitated as Cr-containing carbide) × 100/ {(wt. % of the entirety of C contained in steel) − 0.012%} | Resistance to intergranular corrosion (Strauss test). | Final heat treatment conditions |||| Remarks |
|---|---|---|---|---|---|---|---|---|---|
| | | | | | Material type | Temperature (° C.) | Time | Cooling | |
| 10 | 0.54, 0.63 | 0.2–0.6 | 76 * | Through-crack | A | 80 | 24 h | AC | Comparative examples |
| 11 | 0.72, 0.78 | 0.4–0.8 | 75 * | | A | 80 * | 24 h | AC | |
| 12 | 0.92, 0.91 | 0.2–0.7 | 77 * | | A | 80 * | 24 h | AC | |
| 13* | 0.92, 0.89 | 0.4–0.8 | 92 | Generation of cracks | A | 20 | 24 h | OQ | |
| 14* | 0.87, 0.88 | 0.4–0.8 | 92 | No crack | A | 30 | 24 h | OQ | |
| 15* | 0.92, 0.86 | 0.3–0.8 | 108 | | A | 30 | 24 h | OQ | |
| 16* | 0.43, 0.46 | 0.3–0.8 | 99 | | A | 30 | 24 h | FC | |
| 17* | 0.44, 0.42 | 0.4–0.8 | 101 | | A | 30 | 24 h | FC | |
| 18* | 1.03, 1.12 | 0.2–0.4 | 92 | Generation of cracks | A | 30 | 24 h | OQ | |
| 19* | 0.87, 0.84 | 0.3–0.5 | 109 | No crack | A | 30 | 24 h | FC | |
| 20* | 1.23, 1.07 | 0.2–0.4 | 107 | | A | 30 | 24 h | FC | |

TABLE 8-continued

| Steel No. | Contact electrical resistance with respect to a carbon plate (Ω · cm²) Static load applied: 12 kg/cm² Contact area of a test piece: 1 cm² Surface of a test piece: Polished with #600 Emery | Evaluation conducted when a separator plate was mounted inside a PEFC membrane electrode assembly Voltage drop ratio in membrane electrode assembly after elapse of 1 hour: 1 − {V (after passage of time)/V (initial)} | I value of tested materials: I value = (wt. % of C precipitated as Cr-containing carbide) × 100/ {(wt. % of the entirety of C contained in steel) − 0.012%} | Resistance to intergranular corrosion (Strauss test). | Final heat treatment conditions ||||
|---|---|---|---|---|---|---|---|---|
| | | | | | Material type | Temperature (° C.) | Time | Cooling | Remarks |
| 21* | 0.93, 0.91 | >0.8 | 92 | Corrosion on on entire surface | A | 30 | 24 h | OQ | |

Symbol "*" refers to conditions outside the scope of the present invention.
WQ: Water quenching,
OQ: Oil quenching,
AC: Air cooling,
FC: Furnace cooling
A: Hot-rolled steel,
B: Cold-rolled steel The amount (wt. % of C contained in precipitated Cr-containing carbide) was quantitatively determined on the basis of the results of quantitative determination of Cr in extraction residue, which was obtained after performance of controlled-current electrolysis of a test piece in a non-aqueous solution; i.e., an AA solution (10% acetylacetone 1% tetramethylammonium chloride-balance methanol). Specifically, a test piece was electrolyzed in a non-aqueous AA solution at a current density of 20 mA/cm² for approximately 3–5 hours, to thereby dissolve approximately 0.4 g thereof. Immediately after completion of electrolysis, the test piece was washed in a non-aqueous AA solution under application of ultrasound. The two AA solutions were combined, and filtered through a filter (0.2 $\mu$m) (Nucleopore, product of Coster Scientific Corporation). The residue on the filter was dissolved in a sulfuric acid-phosphoric acid mixture (sulfuric acid (special grade):phosphoric acid (special grade):distilled water=1:1:1). The Cr concentration was quantitatively determined through analysis by means of an inductively coupled plasma emission spectrometer (ICPV-1014, product of SHIMADZU CORPORATION). The C content was calculated under the assumption that all Cr assumed the form of $Cr_{23}C_6$. The amount (wt. % of the entirety of C in steel) was quantitatively determined through a customarily employed infrared absorption spectrometry technique.

The test results are shown in Tables 7 and 8.

As is clear from Tables 7 and 8, test pieces falling within the scope of the present invention have a contact electrical resistance as low as 0.21 Ω·cm² or less, whereas comparative test pieces have a contact electrical resistance as high as 0.33–1.12 Ω·cm².

Even though steel sheets have the same chemical composition, the precipitation state of carbides varies depending on conditions of hot-rolling, cooling after hot-rolling, and heat treatment for precipitating Cr carbides. Thus, corrosion resistance, contact electrical resistance, and performance of a PEFC vary with the extent of formation of a chromium depletion layer.

Steel sample Nos. 13 through 15 and 18 through 21 having a C content less than 0.01% exhibit high contact electrical resistance, which is due to a low degree of carbide precipitation.

The higher the I value, the greater the amount of Cr carbide precipitated from C in steel. When the I value is less than 80, contact electrical resistance with a carbon sheet and performance of a PEFC are unsatisfactory. The results show that contribution of I value is more significant when the C content in steel is low, and that a low I value results in poor performance of a fuel cell.

In evaluation of characteristics of a bipolar plate incorporated into a PEFC, all samples falling within the scope of the present invention show a voltage drop ratio less than 0.05, whereas comparative samples having a chemical composition falling outside the scope of the present invention show a voltage drop ratio as considerably high as 0.2 to 0.8.

EXAMPLE 3

Each of 21 ferritic stainless steel samples having chemical compositions shown in Table 9 was melted in a 150-kg vacuum melting furnace through high-frequency induction heating. Commercially available raw materials were used to produce a melt, the amounts of impurities in the steel were adjusted, and a commercially available Fe—B alloy was used so as to add B to the steel.

TABLE 9

(wt. %; balance: Fe)

| No. | C | Si | Mn | P | S | Cu | Ni | Cr | Mo | V | N | Al | B | Cr + 3 Mo − 2.5 B | |
|---|---|---|---|---|---|---|---|---|---|---|---|---|---|---|---|
| 1 | 0.012 | 0.25 | 0.22 | 0.027 | 0.0012 | 0.03 | 0.01 | 17.55 | — | 0.03 | 0.015 | 0.022 | 0.12 | 17.25 | Present |
| 2 | 0.012 | 0.50 | 0.22 | 0.028 | 0.0011 | 0.04 | 0.01 | 19.53 | — | 0.03 | 0.015 | 0.023 | 0.95 | 17.15 | invention |
| 3 | 0.013 | 0.54 | 0.26 | 0.011 | 0.0012 | 0.02 | 0.01 | 21.05 | — | 0.02 | 0.016 | 0.025 | 1.52 | 17.25 | |
| 4 | 0.014 | 0.32 | 0.28 | 0.011 | 0.0006 | 0.03 | 0.01 | 22.15 | — | 0.04 | 0.019 | 0.023 | 2.01 | 17.12 | |

TABLE 9-continued (wt. %; balance: Fe)

| No. | C | Si | Mn | P | S | Cu | Ni | Cr | Mo | V | N | Al | B | Cr + 3 Mo − 2.5 B | |
|---|---|---|---|---|---|---|---|---|---|---|---|---|---|---|---|
| 5 | 0.012 | 0.12 | 0.28 | 0.023 | 0.0018 | 0.04 | 0.01 | 24.91 | — | 0.03 | 0.016 | 0.020 | 3.12 | 17.11 | |
| 6 | 0.012 | 0.21 | 0.48 | 0.014 | 0.0016 | 0.07 | 0.25 | 17.50 | 1.12 | 0.03 | 0.015 | 0.026 | 0.0098 | 20.61 | |
| 7 | 0.011 | 0.51 | 0.45 | 0.012 | 0.0016 | 0.05 | 0.21 | 19.67 | 1.11 | 0.03 | 0.016 | 0.021 | 0.98 | 20.55 | |
| 8 | 0.004 | 0.30 | 0.08 | 0.012 | 0.0007 | 0.11 | 0.15 | 19.14 | 2.52 | 0.03 | 0.005 | 0.024 | 0.008 | 26.68 | |
| 9 | 0.003 | 0.11 | 0.08 | 0.031 | 0.0036 | 0.08 | 0.01 | 21.38 | 2.56 | 0.03 | 0.005 | 0.023 | 0.85 | 26.93 | |
| 10 | 0.002 | 0.12 | 0.11 | 0.025 | 0.0082 | 0.09 | 1.02 | 30.55 | 2.03 | 0.03 | 0.005 | 0.027 | 0.98 | 34.19 | |
| 11 | 0.002 | 0.14 | 0.12 | 0.009 | 0.0081 | 0.50 | 1.51 | 30.69 | 2.02 | 0.03 | 0.006 | 0.028 | 1.02 | 34.20 | |
| 12 | 0.002 | 0.15 | 0.13 | 0.004 | 0.0012 | 0.28 | 4.02 | 31.88 | 4.12 | 0.04 | 0.004 | 0.022 | 1.01 | 41.71 | |
| 13 | 0.015 | 0.48 | 0.25 | 0.027 | 0.007 | 0.011 | 0.01 | 16.21* | — | 0.03 | 0.016 | 0.017 | 0.0001* | 16.21* | Comparative |
| 14 | 0.016 | 0.46 | 0.51 | 0.029 | 0.0110* | 0.011 | 0.01 | 17.32 | — | 0.03 | 0.013 | 0.019 | 0.0002* | 17.32 | examples |
| 15 | 0.013 | 0.46 | 1.55* | 0.028 | 0.006 | 0.012 | 0.01 | 17.33 | — | 0.04 | 0.015 | 0.012 | 0.000i* | 17.33 | |
| 16 | 0.012 | 0.36 | 0.27 | 0.037* | 0.005 | 0.010 | 0.12 | 17.26 | 1.20 | 0.03 | 0.015 | 0.007 | 0.0001* | 20.80 | |
| 17 | 0.015 | 0.30 | 1.65* | 0.028 | 0.0125* | 0.25 | 0.20 | 17.18 | 1.18 | 0.03 | 0.017 | 0.009 | 0.0002* | 20.72 | |
| 18 | 0.003 | 0.35 | 0.08 | 0.028 | 0.0023 | 1.50* | 0.12 | 19.18 | 2.51 | 0.04 | 0.005 | 0.008 | 0.0001* | 26.71 | |
| 19 | 0.004 | 0.55 | 0.08 | 0.025 | 0.0024 | 0.12 | 0.15 | 19.20 | 2.50 | 0.04 | 0.003 | 0.013 | 0.0002* | 26.70 | |
| 20 | 0.003 | 0.58 | 0.21 | 0.038* | 0.0013 | 0.11 | 0.08 | 28.12 | 2.10 | 0.03 | 0.003 | 0.011 | 0.0002* | 34.42 | |
| 21 | 0.005 | 1.65* | 0.12 | 0.020 | 0.0013 | 0.08 | 0.06 | 29.25 | 4.08 | 0.04 | 0.004 | 0.011 | 0.0001* | 41.49 | |

Symbol "*" refers to conditions outside the scope of the present invention.

Each stainless steel was cast into ingots having a circular cross-section. Each ingot was heated at 1180° C. for three hours in air and hot-forged by means of a press-forging machine, to thereby prepare six steel slabs having dimensions of 20 mm in thickness, 100 mm in width, and 150 mm in length. Each of the slabs was subjected to machining so as to remove oxide scale and edge tearing, to thereby prepare a slab having a thickness of 15 mm. The slab was heated at 1180° C. in air, and hot-rolled to thereby prepare a steel sheet having a thickness of 4 mm. The steel sheet was slowly cooled under thermal-insulator rolling conditions which simulate a temperature hysteresis carried out immediately after hot rolling during actual production.

Although an $M_2B$ boride compound is an intermetallic compound, the compound has very poor formability at ambient and high temperature, and may cause tearing of a steel product during hot working. Therefore, forging and rolling were carried out within a temperature range of 1000–1180° C. with repeated heating. Since the temperature of both ends of a coil is easily lowered to thereby cause edge tearing, hot rolling was carried out while the ends of the coil were heated.

The hot-rolled material was annealed at 810° C. in air, cooled in air, pickled, and cold-rolled by means of a cold-rolling mill. Optionally, a coil having an intermediate sheet thickness was subjected to softening at 810° C. and pickling in accordance with needs. Finally, cold rolling was completed, to thereby prepare a coil having a target thickness of 0.3 mm.

The cold-rolled coil was annealed at 810° C. in air and pickled, to thereby prepare a sample. Upon completion of pickling, the surface appearance of the coil was completely identical with that of customary ferritic stainless steel, as judged with the naked eye.

Figure 6:
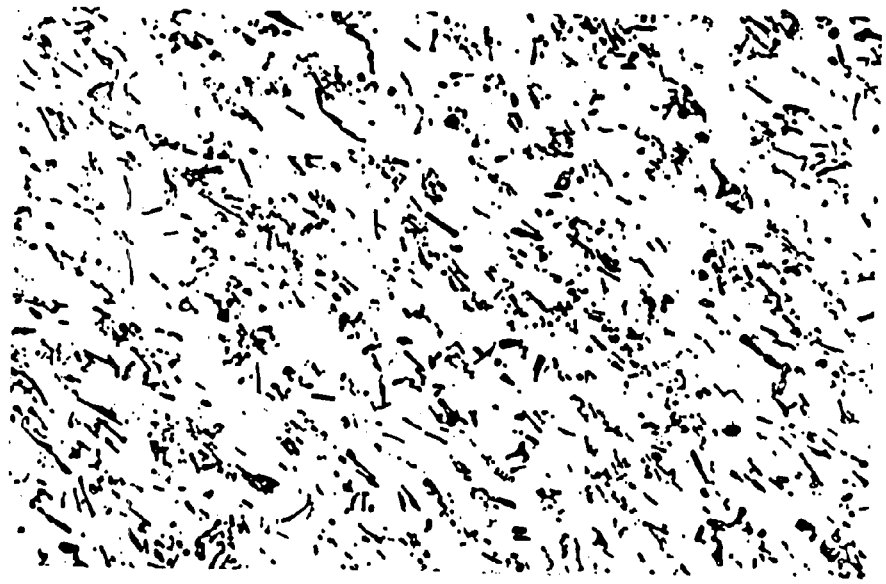
FIG. 6 is a microphotograph showing $M_2B$ metallic inclusions of boride exposed on the surface of ferritic stainless steel.

FIG. 6 shows the metallurgical microstructure (×200) of a cold-rolled sheet. The dispersion phase comprises an $M_2B$ boride compound.

The B content of steel pieces was quantitatively determined in the following manner.

Specifically, while current was controlled, a test piece was electrolyzed in a non-aqueous AA solution (10% acetylacetone—1% tetramethylammonium chloride-balance methanol) at a current density of 20 mA/cm² for approximately 3 hours, to thereby dissolve approximately 0.4 g thereof. Immediately after completion of electrolysis, the test piece was washed in a non-aqueous AA solution under application of ultrasound. The two AA solutions were combined, and filtered through a filter (0.2 μm) (Nucleopore, product of Coster Scientific Corporation). An $M_2B$ compound remaining on the filter was analyzed.

When steel contained a small amount of a boride and the residue on the filter was 40 μg or less, the combined AA solution was distilled, and quantitatively determined through curcumin absorption spectroscopic analysis. When the residue was 40 μg or more, the residue on the filter was dissolved in a sulfuric acid-phosphoric acid mixture (sulfuric acid (special grade):phosphoric acid (special grade) :distilled water=1:1:1). The concentrations of metallic components in boride precipitation were quantitatively determined through analysis by means of an inductively coupled plasma emission spectrometer (ICPV-1014, product of SHIMADZU CORPORATION), to thereby obtain the amount of B. This method is typically employed for quantitative determination of B.

Contact electrical resistance with a carbon sheet was measured in the following manner. Each test piece was brought into contact (contact area 1 cm²) with a commercially available glassy carbon sheet having a thickness of 0.6 mm, and resistance was measured through a four-terminal method. The surface of the test piece was polished by use of emery paper (wet, No. 600) and washed immediately before measurement. A load of 12 kg/cm² was applied for measurement of contact electrical resistance. Although the contact electrical resistance varied with the load, the resistance became almost constant when the load was regulated to 12 kg/cm².

The details of bipolar plates which had a corrugated form and were employed for evaluating performance thereof in a fuel cell are described as follows. Among the steel samples, steel sample No. 5 was difficult to work into a thin sheet at ambient temperature. Thus, a hot-rolled coil having a thickness of 4 mm was mechanically worked to thereby form gas channels. The appearance of the bipolar plates was similar to that shown in FIG. 1. Grooves having a width of 2 mm and a depth of 1 mm were provided on both sides, to thereby form an anode side and a cathode side.

(1) Shape of Bipolar Plates
From steel sheet having a thickness of 0.3 mm
thickness 0.3 mm, length 80 mm×width 80 mm
gas channels: height 0.8 mm,
interval between ridges 1.2 mm (corrugated)
(2) Surface Finishing of Bipolar Plates The finishing treatment involved the steps of: mechanically polishing a surface by use of SiC grinding particles for shot blasting; and washing in a 5% $HNO_3$, 3% HF solution at 40° C. for 15 minutes under application of ultrasound; degreasing immediately before testing, by spraying a 6% aqueous solution of sodium hydroxide; pre-washing with flow of water; soaking three times in a batch tank containing distilled water for washing; spraying distilled water for four minutes of washing; and drying with unheated air by means of a drier.

Characteristics of a bipolar plate incorporated into a membrane electrode assembly of a PEFC were evaluated by measuring the voltage of a membrane electrode assembly one hour after introduction of a fuel gas into the fuel cell and comparing the voltage with the initial voltage, to thereby obtain the voltage drop ratio, which was calculated by the following formula: 1—(voltage one hour after V/initial voltage V).

A commercially available fuel cell (Cell FC50, product of Electrochem (US)) was modified, to thereby serve as a PEFC employed in the evaluation.

Hydrogen (99.9999% purity) was employed as a fuel gas in an anode, while air was employed as a cathode gas. The entire cell was maintained at 78±2° C., and the humidity in the cell was controlled at an input portion of the cell on the basis of measurement of the water content of exhaust gas in an output portion thereof. The pressure inside the cell was 1 atm. The pressure of hydrogen and air fed into the cell was controlled to 0.04–0.20 bar. When a specific level of 500±20 $mA/cm^2$—0.62±0.04 V was confirmed, measurement was carried out continuously, to thereby evaluate cell performance.

A system for measuring characteristics of a fuel cell, which was based on a commercially available system (Series 800, product of SCRIBNER ASSOCIATES Inc.), was modified, to thereby serve as a system for measuring characteristics of a membrane electrode assembly. Since the characteristics seemed to vary depending on operational conditions of the cell, measurement was carried out under the same conditions. Measuring results are shown in Table 10.

As is clear from Table 10, in evaluation of characteristics of a bipolar plate incorporated into a PEFC, all samples falling within the scope of the present invention exhibit a voltage drop ratio less than 0.05, whereas comparative samples having a chemical composition falling outside the scope of the present invention exhibit a voltage drop ratio as considerably high as more than 0.8. Samples falling within the scope of the present invention have a contact electrical resistance of 0.13 $\Omega \cdot cm^2$ or less, whereas comparative samples have a contact electrical resistance of as high as 0.53–0.96 $\Omega \cdot cm^2$.

TABLE 10

| Steel No. | Contact electrical resistance with respect to a carbon plate ($\Omega \cdot cm^2$) Static load applied: 12 $kg/cm^2$ Contact area of a test piece: 1 $cm^2$ Surface of a test piece: Polished with #600 Emery | Evaluation conducted when a separator plate was mounted inside a PEFC membrane electrode assembly Voltage drop ratio in membrane electrode assembly after elapse of 1 hour: 1 - {V (after passage of time)/V (initial)} |
|---|---|---|
| | Present invention | |
| 1 | 0.13, 0.12 | <0.05 |
| 2 | 0.11, 0.12 | <0.05 |
| 3 | 0.10, 0.10 | <0.05 |
| 4 | 0.10, 0.10 | <0.05 |
| 5 | 0.10, 0.10 | <0.05 |
| 6 | 0.12, 0.13 | <0.05 |
| 7 | 0.11, 0.10 | <0.05 |
| 8 | 0.11, 0.12 | <0.05 |
| 9 | 0.11, 0.10 | <0.05 |
| 10 | 0.09, 0.09 | <0.05 |
| 11 | 0.10, 0.10 | <0.05 |
| 12 | 0.10, 0.11 | <0.05 |
| | Comparative examples | |
| 13 | 0.53, 0.58 | >0.8 |
| 14 | 0.87, 0.90 | >0.8 |
| 15 | 0.91, 0.92 | >0.8 |
| 16 | 0.93, 0.96 | >0.8 |
| 17 | 0.94, 0.92 | >0.8 |
| 18 | 0.83, 0.82 | >0.8 |
| 19 | 0.84, 0.84 | >0.8 |
| 20 | 0.86, 0.86 | >0.8 |
| 21 | 0.83, 0.82 | >0.8 |

EXAMPLE 4

Each of 21 austenitic stainless steel samples having chemical compositions shown in Table 11 was melted in a 150-kg vacuum melting furnace through high-frequency induction heating. Commercially available raw materials were used to produce a melt, the amounts of impurities in the steel were adjusted, and a commercially available Fe—B alloy was used so as to add B to the steel.

TABLE 11

(wt. %; balance: Fe)

| Steel No. | C | Si | Mn | P | S | Cu | Ni | Cr | Mo | V | N | Al | B | Cr + 3 Mo − 2.5 B | |
|---|---|---|---|---|---|---|---|---|---|---|---|---|---|---|---|
| 1 | 0.018 | 0.65 | 1.02 | 0.028 | 0.0078 | 0.25 | 8.4 | 18.82 | — | 0.08 | 0.025 | 0.015 | 0.12 | 18.52 | Present invention |
| 2 | 0.023 | 0.50 | 1.02 | 0.018 | 0.0007 | 0.08 | 8.3 | 20.43 | — | 0.06 | 0.018 | 0.016 | 0.80 | 18.43 | |
| 3 | 0.022 | 0.54 | 0.56 | 0.011 | 0.0082 | 0.12 | 8.2 | 22.20 | — | 0.08 | 0.037 | 0.025 | 1.55 | 18.33 | |
| 4 | 0.023 | 0.32 | 0.08 | 0.011 | 0.0006 | 0.11 | 8.4 | 23.45 | — | 0.05 | 0.035 | 0.018 | 2.01 | 18.43 | |
| 5 | 0.019 | 0.12 | 0.08 | 0.013 | 0.0008 | 0.08 | 8.4 | 24.76 | — | 0.05 | 0.036 | 0.022 | 2.52 | 18.46 | |
| 6 | 0.022 | 1.21 | 1.50 | 0.010 | 0.0006 | 0.11 | 11.5 | 16.91 | 2.18 | 0.08 | 0.035 | 0.016 | 0.0092 | 23.43 | |
| 7 | 0.021 | 0.51 | 2.00 | 0.011 | 0.0006 | 0.05 | 11.5 | 18.68 | 2.12 | 0.05 | 0.046 | 0.026 | 0.81 | 23.21 | |
| 8 | 0.024 | 0.30 | 0.08 | 0.012 | 0.0007 | 0.11 | 11.5 | 20.87 | 2.22 | 0.03 | 0.061 | 0.022 | 1.58 | 23.58 | |

TABLE 11-continued (wt. %; balance: Fe)

| Steel No. | C | Si | Mn | P | S | Cu | Ni | Cr | Mo | V | N | Al | B | Cr + 3 Mo − 2.5 B | |
|---|---|---|---|---|---|---|---|---|---|---|---|---|---|---|---|
| 9 | 0.022 | 0.11 | 0.08 | 0.031 | 0.0076 | 0.06 | 11.6 | 21.96 | 2.23 | 0.06 | 0.035 | 0.020 | 2.03 | 23.57 | |
| 10 | 0.021 | 0.12 | 0.18 | 0.028 | 0.0081 | 0.01 | 18.1 | 23.20 | 6.21 | 0.07 | 0.185 | 0.017 | 0.63 | 40.25 | |
| 11 | 0.022 | 0.51 | 0.22 | 0.009 | 0.0088 | 2.51 | 25.4 | 23.02 | 4.51 | 0.06 | 0.006 | 0.018 | 0.58 | 35.10 | |
| 12 | 0.019 | 0.50 | 1.10 | 0.004 | 0.0012 | 0.28 | 48.9 | 26.60 | 6.32 | 0.03 | 0.002 | 0.012 | 0.59 | 44.08 | |
| 13 | 0.065* | 0.48 | 1.08 | 0.027 | 0.007 | 0.010 | 12.1 | 16.68* | — | 0.12 | 0.006 | 0.017 | 0.0001* | 16.68* | Comparative |
| 14 | 0.056* | 0.46 | 0.09 | 0.029 | 0.0113* | 0.010 | 8.22 | 18.32 | — | 0.12 | 0.008 | 0.018 | 0.0002* | 18.32 | examples |
| 15 | 0.013 | 0.46 | 0.45 | 0.028 | 0.005 | 0.009 | 12.2 | 18.36* | — | 0.11 | 0.36* | 0.022 | 0.0001* | 18.36 | |
| 16 | 0.052* | 0.36 | 0.37 | 0.037* | 0.008 | 0.010 | 8.21 | 16.86 | 2.21 | 0.13 | 0.015 | 0.091 | 0.0001* | 23.49 | |
| 17 | 0.065* | 0.30 | 0.45 | 0.028 | 0.0125* | 0.25 | 8.12 | 16.89 | 2.19 | 0.11 | 0.017 | 0.019 | 0.0002* | 23.46 | |
| 18 | 0.018 | 0.35 | 0.08 | 0.028 | 0.0058 | 3.50* | 20.0 | 16.91 | 2.23 | 0.11 | 0.005 | 0.018 | 0.0001* | 23.60 | |
| 19 | 0.107* | 0.55 | 0.22 | 0.025 | 0.0068 | 0.12 | 6.8* | 20.89 | 6.18 | 0.08 | 0.003 | 0.112 | 0.0002* | 39.43 | |
| 20 | 0.101* | 0.58 | 2.61* | 0.038* | 0.0011 | 0.11 | 25.8 | 21.55 | 4.55 | 0.08 | 0.038 | 0.024 | 0.0002* | 35.20 | |
| 21 | 0.250* | 0.65* | 0.12 | 0.020 | 0.0013 | 0.08 | 12.12 | 25.15 | 7.28* | 0.04 | 0.031 | 0.025 | 0.0001* | 43.99 | |

Symbol "*" refers to conditions outside the scope of the present invention.

Each stainless steel was cast into ingots having a circular cross-section. Each ingot was heated at 1180° C. for three hours in air and hot-forged by means of a press-forging machine, to thereby prepare slabs having dimensions of 70 mm in thickness, 380 mm in width, and 550 mm in length. Each of the slabs was subjected to machining so as to remove oxide scale and edge tearing, to thereby prepare a slab having a thickness of 60 mm. The slab was heated at 1180° C. in air, and hot-rolled to thereby prepare a steel sheet having a thickness of 4 mm. The steel sheet was slowly cooled under thermal insulator rolling conditions which simulate a temperature hysteresis carried out immediately after hot rolling during actual production.

Although an $M_2B$ boride compound is an intermetallic compound, the compound has very poor formability at ambient and high temperature, and may cause tearing of a steel product during hot working. Therefore, forging and rolling were carried out within a temperature range of about 1000–1200° C. with repeated heating. Since the temperature of both ends of a coil is easily lowered to thereby cause edge tearing, hot rolling was carried out while the ends of the coil were heated.

The hot-rolled material was annealed at 1080° C. in air, cooled in air, pickled, and cold-rolled by means of a cold-rolling mill. Optionally, a coil having an intermediate sheet thickness was subjected to softening at 1080° C. and pickling in accordance with needs. Finally, cold rolling was completed, to thereby prepare a coil having a target thickness of 3 mm.

The cold-rolled coil was annealed at 810° C. in air and pickled, to thereby prepare a sample. Upon completion of pickling, the surface appearance of the coil was completely identical with that of customary austenitic stainless steel, as judged with the naked eye.

The B content of steel pieces was quantitatively determined in the following manner.

Specifically, while current was controlled, a test piece was electrolyzed in a non-aqueous AA solution (10% acetylacetone—1% tetramethylammonium chloride-balance methanol) at a current density of 20 mA/cm² for approximately 3 hours, to thereby dissolve approximately 0.4 g thereof. Immediately after completion of electrolysis, the test piece was washed in a non-aqueous AA solution under application of ultrasound. The two AA solutions were combined, and filtered through a filter (0.2 μm) (Nucleopore, product of Coster Scientific Corporation). An $M_2B$ compound remaining on the filter was analyzed.

When steel contained a small amount of boride and the residue on the filter was 40 μg or less, the combined AA solution was distilled and subjected to quantitative determination through curcumin absorption spectroscopic analysis. When the residue was 40 μg or more, the residue on the filter was dissolved in a sulfuric acid-phosphoric acid mixture (sulfuric acid (special grade):phosphoric acid (special grade) :distilled water=1:1:1). The concentrations of metallic components in boride precipitation were quantitatively determined through analysis by means of an inductively coupled plasma emission spectrometer (ICPV-1014, product of SHIMADZU CORPORATION), to thereby obtain the amount of B. This method is typically employed for quantitative determination of B.

Figure 7:
FIG. 7 is a microphotograph showing $M_2B$ metallic inclusions of boride exposed on the surface of austenitic stainless steel.

FIG. 7 shows the metallurgical microstructure (×200) of a cold-rolled sheet. The dispersion phase comprises an $M_2B$ boride compound.

Contact electrical resistance with a carbon sheet was measured in the following manner. Each test piece was brought into contact (contact area 1 cm²) with a commercially available glassy carbon sheet having a thickness of 0.6 mm, and resistance was measured through a four-terminal method. The surface of the test piece was polished by use of emery paper (wet, No. 600) and washed immediately before measurement. A load of 12 kg/cm² was applied for measurement of contact electrical resistance. Although the contact electrical resistance varied with the load, the resistance became almost constant when the load was regulated to 12 kg/cm².

The details of bipolar plates which had a corrugated form and were employed for evaluating performance thereof in a fuel cell are described as follows. Among the steel samples, steel sample No. 5 was difficult to work into a thin sheet at ambient temperature. Thus, a hot-rolled coil having a thickness of 4 mm was mechanically worked to thereby form gas channels. The appearance of the bipolar plates was similar to that shown in FIG. 1. Grooves having a width of 2 mm and a depth of 1 mm were provided on both sides, to thereby form an anode side and a cathode side.

(1) Shape of Bipolar Plates

From steel sheet having a thickness of 0.3 mm
thickness 0.3 mm, length 80 mm×width 80 mm
gas channels: height 0.8 mm,
interval between ridges 1.2 mm (corrugated)

(2) Surface Finishing of Bipolar Plates

The finishing treatment involved the steps of: mechanically polishing a surface by use of SiC grinding particles for shot blasting; and washing in a 5% $HNO_3$, 3% HF solution at 40° C. for 15 minutes under application of ultrasound; degreasing immediately before testing, by spraying a 6% aqueous solution of sodium hydroxide; pre-washing with flow of water; soaking three times in a batch tank containing distilled water for washing; spraying distilled water for four minutes of washing; and drying with unheated air by means of a drier.

Characteristics of a bipolar plate incorporated into a membrane electrode assembly of a PEFC were evaluated by measuring the voltage of a membrane electrode assembly one hour after introduction of a fuel gas into the fuel cell and comparing the voltage with the initial voltage, to thereby obtain the voltage drop ratio, which was calculated by the following formula: 1—(voltage one hour after V/initial voltage V).

A commercially available fuel cell (Cell FC50, product of Electrochem (US)) was modified, to thereby serve as a PEFC employed in the evaluation.

Hydrogen (99.9999% purity) was employed as a fuel gas in the anode, while air was employed as a cathode gas. The entire cell was maintained at 78±2° C., and the humidity in the cell was controlled at an input portion of the cell on the basis of measurement of the water content of exhaust gas in an output portion thereof. The pressure inside the cell was 1 atm. The pressure of hydrogen and air fed into the cell was controlled to 0.04–0.20 bar. When a specific level of 500±20 $mA/cm^2$—0.62±0.04 V was confirmed, measurement was carried out continuously, to thereby evaluate cell performance.

A system for measuring characteristics of a fuel cell, which was based on a commercially available system (Series 800, product of SCRIBNER ASSOCIATES Inc.), was modified, to thereby serve as a system for measuring characteristics of a membrane electrode assembly. Since the characteristics seemed to vary depending on operational conditions of the cell, measurement was carried out under the same conditions. The results are shown in Table 12.

As is clear from Table 12, in evaluation of characteristics of a bipolar plate incorporated into a PEFC, all samples falling within the scope of the present invention exhibit a voltage drop ratio less than 0.05, whereas comparative samples having a chemical composition falling outside the scope of the present invention exhibit a voltage drop ratio as considerably high as 0.3 or higher. Samples falling within the scope of the present invention have a contact electrical resistance of 0.12 $\Omega \cdot cm^2$ or less, whereas comparative samples have a contact electrical resistance of as high as 0.41–0.96 $\Omega \cdot cm^2$.

TABLE 12

| Steel No. | Contact electrical resistance with respect to a carbon plate ($\Omega \cdot cm^2$) Static load applied: 12 $kg/cm^2$ Contact area of a test piece: 1 $cm^2$ Surface of a test piece: Polished with #600 Emery | Remarks Evaluation conducted when a separator plate was mounted inside a PEFC membrane electrode assembly Voltage drop ratio in membrane electrode assembly after elapse of 1 hour: 1 - {V (after passage of time)/V (initial)} |
|---|---|---|
| | Present invention | |
| 1 | 0.12, 0.10 | <0.05 |
| 2 | 0.11, 0.12 | <0.05 |
| 3 | 0.12, 0.11 | <0.05 |
| 4 | 0.10, 0.11 | <0.05 |
| 5 | 0.11, 0.10 | <0.05 |
| 6 | 0.09, 0.10 | <0.05 |
| 7 | 0.11, 0.10 | <0.05 |
| 8 | 0.09, 0.10 | <0.05 |
| 9 | 0.10, 0.10 | <0.05 |
| 10 | 0.09, 0.09 | <0.05 |
| 11 | 0.11, 0.11 | <0.05 |
| 12 | 0.12, 0.11 | <0.05 |
| | Comparative examples | |
| 13* | 0.52, 0.48 | >0.3 |
| 14* | 0.89, 0.89 | >0.3 |
| 15* | 0.92, 0.96 | 0.6–0.8 |
| 16* | 0.43, 0.46 | >0.8 |
| 17* | 0.44, 0.42 | >0.8 |
| 18* | 0.43, 0.42 | >0.8 |
| 19* | 0.87, 0.84 | >0.8 |
| 20* | 0.83, 0.87 | >0.8 |
| 21* | 0.43, 0.41 | >0.8 |

Symbol "*" refers to conditions outside the scope of the present invention.

EXAMPLE 5

Each of 21 ferritic stainless steel samples having chemical compositions shown in Table 13 was melted in a 150-kg vacuum melting furnace through high-frequency induction heating. Commercially available raw materials were used to produce a melt, and the amounts of impurities in the steel were adjusted.

TABLE 13

(wt. %; balance: Fe)

| Steel No. | C | Si | Mn | P | S | Cu | Ni | Cr | Mo | N | Al | Cr + 3 Mo | Remarks |
|---|---|---|---|---|---|---|---|---|---|---|---|---|---|
| 1 | 0.028 | 0.56 | 1.02 | 0.028 | 0.0078 | 0.25 | 12.1 | 17.8 | 2.01 | 0.025 | 0.01 | 23.83 | Present |
| 2 | 0.065 | 0.52 | 1.02 | 0.018 | 0.0007 | 0.08 | 8.3 | 18.1 | — | 0.018 | 0.01 | 18.1 | invention |
| 3 | 0.086 | 0.15 | 0.56 | 0.011 | 0.0082 | 0.01 | 12.6 | 17.2 | 2.08 | 0.037 | 0.08 | 23.44 | |
| 4 | 0.083 | 0.53 | 0.08 | 0.011 | 0.0006 | 0.01 | 8.1 | 18.1 | — | 0.035 | 0.01 | 18.1 | |
| 5 | 0.082 | 0.51 | 1.02 | 0.013 | 0.0008 | 0.08 | 8.2 | 17.9 | — | 0.036 | 0.01 | 17.9 | |
| 6 | 0.082 | 0.81 | 1.51 | 0.010 | 0.0006 | 0.01 | 8.1 | 18.2 | — | 0.035 | 0.01 | 18.2 | |
| 7 | 0.081 | 1.21 | 2.08 | 0.011 | 0.0006 | 0.05 | 12.1 | 17.3 | 2.02 | 0.046 | 0.01 | 23.36 | |
| 8 | 0.080 | 1.42 | 0.98 | 0.012 | 0.0007 | 2.51 | 10.1 | 18.9 | 2.10 | 0.061 | 0.01 | 25.2 | |
| 9 | 0.042 | 0.25 | 0.12 | 0.031 | 0.0076 | 0.06 | 18.1 | 20.1 | 6.21 | 0.255 | 0.01 | 38.73 | |
| 10 | 0.121 | 0.12 | 0.16 | 0.028 | 0.0081 | 0.01 | 25.3 | 20.1 | 4.51 | 0.005 | 0.01 | 33.63 | |

TABLE 13-continued (wt. %; balance: Fe)

| Steel No. | C | Si | Mn | P | S | Cu | Ni | Cr | Mo | N | Al | Cr + 3 Mo | Remarks |
|---|---|---|---|---|---|---|---|---|---|---|---|---|---|
| 11 | 0.152 | 0.52 | 0.23 | 0.009 | 0.0088 | 0.12 | 48.9 | 25.3 | 6.32 | 0.006 | 0.01 | 44.26 | |
| 12 | 0.189 | 0.51 | 1.10 | 0.004 | 0.0012 | 0.28 | 8.1 | 18.1 | — | 0.002 | 0.12 | 18.1 | |
| 13 | 0.008* | 0.48 | 1.08 | 0.027 | 0.007 | 0.010 | 12.1 | 17.7 | 2.03 | 0.006 | 0.01 | 23.79 | Comparative examples |
| 14 | 0.009* | 0.28 | 0.09 | 0.029 | 0.0113* | 0.010 | 8.22 | 18.2 | — | 0.008 | 0.01 | 18.2 | |
| 15 | 0.013* | 0.26 | 0.45 | 0.028 | 0.005 | 0.009 | 12.2 | 17.2 | 2.03 | 0.36* | 0.01 | 23.29 | |
| 16 | 0.082 | 0.46 | 0.37 | 0.037* | 0.008 | 0.010 | 8.21 | 18.1 | — | 0.015 | 0.09 | 18.1 | |
| 17 | 0.080 | 0.30 | 0.45 | 0.028 | 0.0125* | 0.25 | 8.12 | 18.3 | — | 0.017 | 0.01 | 18.3 | |
| 18 | 0.078 | 0.35 | 0.08 | 0.028 | 0.0058 | 3.50* | 20.0 | 25.2 | — | 0.005 | 0.01 | 25.2 | |
| 19 | 0.107 | 0.05 | 0.22 | 0.025 | 0.0068 | 0.12 | 6.8* | 25.2 | 3.03 | 0.003 | 0.11 | 34.29 | Duplex structure |
| 20 | 0.101 | 0.08 | 2.61* | 0.038* | 0.0011 | 0.11 | 25.8 | 20.2 | 4.42 | 0.038* | 0.02 | 33.46 | Hot-rolling impossible; significant tearing from a side edge |
| 21 | 0.25* | 3.10* | 0.12 | 0.020 | 0.0013 | 0.08 | 12.12 | 17.5 | 2.01 | 0.031* | 0.03 | 23.53 | Hot-rolling impossible; significant tearing from a side edge |

Symbol "*" refers to conditions outside the scope of the present invention.

Each stainless steel was cast into ingots having a circular cross-section. The ingots were heated at 1280° C. for three hours in air and hot-forged by means of a press-forging machine. From the ingots were produced two types of slabs for testing having the following dimensions:

(1) thickness of 30 mm, width of 100 mm, length of 120 mm, and (2) thickness of 70 mm, width of 380 mm, length of 550 mm.

The slab (1) was hot-rolled to a steel sheet having a thickness of 6 mm, and the steel sheet was slowly cooled under thermal insulator rolling conditions which simulate a temperature hysteresis carried out immediately after hot rolling during actual production. Subsequently, the hot-rolled steel sheet was maintained in a heating furnace (constant 800° C., under air) for 16 hours, and annealed in the furnace over 48 hours, to thereby prepare a sample (hereinafter referred to as material A).

The slab (2) was subjected to machining so as to remove oxide scale, to thereby prepare a slab having a thickness of 62 mm. The slab was heated at 1200° C. in air, and hot-rolled to thereby prepare a steel sheet having a thickness of 4 mm. In a manner similar to treatment of slab (1), the steel sheet was slowly cooled under thermal insulator rolling conditions which simulate a temperature hysteresis carried out immediately after hot rolling during actual production. Subsequently, the hot-rolled steel sheet was maintained in a heating furnace (constant 800° C., under air) for 16 hours, and annealed in the furnace over 48 hours. The resultant steel sheet was pickled and cold-rolled at a rolling reduction of 80% by means of a cold-roller, to thereby prepare a cold-rolled sheet having a thickness of 0.3 mm (hereinafter referred to as material B).

From each of the hot-rolled steel sheet (material A) and the cold-rolled steel sheet (material B), test pieces were produced; i.e., (1) test pieces for measuring contact electrical resistance; (2) test pieces for a bipolar plate of a PEFC; and (3) intergranular corrosion test pieces. Each test piece was subjected to Cr carbide-precipitation treatment under the final heat treatment conditions shown in the columns in Tables 2 and 3, and subjected to one or more of the above tests. Features of test pieces and test conditions are described as follows. When a bipolar plate was produced from material B, Cr carbide-precipitation treatment was carried out before the material was cold-rolled into a bipolar shape.

(1) Measurement of contact electrical resistance Dimensions of test pieces: thickness 3 mm or 0.3 mm; width 40 mm; length 40 mm Contact electrical resistance was measured in the following manner. Each test piece was brought into contact (contact area 1 cm$^2$) with a commercially available glassy carbon sheet having a thickness of 0.6 mm and serving as an electrode. The resistance was measured through a four-terminal method. Measurement was carried out at two different sites for each test piece. The surface of the test piece was polished by use of emery paper (wet, No. 600) and washed immediately before measurement. A load of 12 kg/cm$^2$ was applied for measurement of contact electrical resistance. Although the contact electrical resistance varied with the load, the resistance became almost constant when the load was regulated to 12 kg/cm$^2$.

(2) Evaluation of characteristics of a bipolar plate incorporated into a PEFC

The bipolar plates which had been produced from material B and subjected to the evaluation have the following characteristics.

a) Shape of Bipolar Plates

From material A thickness 5 mm, length 80 mm×width 80 mm gas channels: height 0.8 mm, interval between ridges 1.2 mm (mechanical processing)

From material B thickness 0.3 mm, length 80 mm×width 80 mm gas channels: height 0.8 mm, interval between ridges 1.2 mm (corrugated)

b) Surface Finishing of Bipolar Plates

The finishing treatment involved the steps of: mechanically polishing a surface by use of SiC grinding particles for shot blasting; washing in a 5% $HNO_3$, 3% HF solution at 40° C. for 15 minutes under application of ultrasound; and neutralizing with an alkali; degreasing immediately before testing, by spraying a 6% aqueous solution of sodium hydroxide; pre-washing with flow of water; soaking three times in a batch tank containing distilled water for washing; spraying distilled water for four minutes of washing; and drying with unheated air by means of a drier.

Characteristics of a bipolar plate incorporated into a membrane electrode assembly of a PEFC were evaluated by measuring the voltage of a membrane electrode assembly one hour after introduction of a fuel gas into the fuel cell and comparing the voltage with the initial voltage, to thereby obtain the voltage drop ratio, which was calculated by the following formula: 1—(voltage one hour after V/initial voltage V).

A commercially available fuel cell (Cell FC50, product of Electrochem (US)) was modified, to thereby serve as a PEFC employed in the evaluation.

Hydrogen (99.9999% purity) was employed as a fuel gas in the anode, while air was employed as a cathode gas. The entire cell was maintained at 78±2° C., and the humidity in the cell was controlled at an input portion of the cell on the basis of measurement of the water content of exhaust gas in an output portion thereof. The pressure inside the cell was 1 atm. The pressure of hydrogen and air fed into the cell was controlled to 0.04–0.20 bar. When a specific level of 500±100 mA/cm$^2$—0.62±0.03 V was confirmed, measurement was carried out continuously, to thereby evaluate cell performance.

A system for measuring characteristics of a fuel cell, which as based on a commercially available system (Series 800, product of SCRIBNER ASSOCIATES Inc.) was modified, to thereby serve as a system for measuring characteristics of a membrane electrode assembly. Since the characteristics seemed to vary depending on operational conditions of the cell, measurement as carried out under the same conditions.

(3) Intergranular Corrosion Test

Intergranular corrosion resistance was investigated on the basis of the Strauss test. A Sulfuric acid-Copper sulfate corrosion test was carried out in accordance with JIS G 0575.

The tests results are shown in Tables 14 and 15.

TABLE 14

| Steel No. | Contact electrical resistance with respect to a carbon plate ($\Omega \cdot cm^2$) Static load applied: 12 kg/cm$^2$ Contact area of a test piece: 1 cm$^2$ Surface of a test piece: Polished with #600 Emery | Evaluation conducted when a separator plate was mounted inside a PEFC membrane electrode assembly Voltage drop ratio in membrane electrode Assembly after elapse of 1 hour: 1 − {V (after Passage of time)/V (initial)} | I value of tested materials: I value = (wt. % of C precipitated as Cr-containing carbide) × 100/{(wt. % of the entirety of C contained in steel) − 0.012%} | Resistance to intergranular corrosion (Strauss test) | Material type | Temperature (° C.) | Time | Cooling | Remarks |
|---|---|---|---|---|---|---|---|---|---|
| 1 | 0.19, 0.20 | <0.05 | 86 | No crack | A | 870 | 30 h | FC | Present |
| 2 | 0.17, 0.18 | <0.05 | 99 | No crack | A | 870 |  | FC | invention |
| 3 | 0.12, 0.13 | <0.05 | 99 | No crack | A | 860 | 48 h | FC |  |
| 4 | 0.13, 0.15 | <0.05 | 99 | No crack | A | 650 | 240 h | FC |  |
| 5 | 0.15, 0.16 | <0.05 | 99 | No crack | A | 910 | 24 h | FC |  |
| 6 | 0.14, 0.15 | <0.05 | 99 | No crack | B | 870 | 3 m | FC |  |
| 7 | 0.14, 0.15 | <0.05 | 99 | No crack | B | 900 | 20 m | FC |  |
| 8 | 0.16, 0.13 | <0.05 | 99 | No crack | B | 910 | 24 h | FC |  |
| 9 | 0.17, 0.16 | <0.05 | 99 | No crack | B | 870 | 12 h | FC |  |
| 10 | 0.13, 0.13 | <0.05 | 87 | No crack | A | 670 | 500 h | FC |  |
| 11 | 0.11, 0.14 | <0.05 | 99 | No crack | A | 670 | 500 h | FC |  |
| 12 | 0.12, 0.11 | <0.05 | 99 | No crack | A | 900 | 2 h | FC |  |

Symbol "*" refers to conditions outside the scope of the present invention.
AC: Air cooling,
FC: Furnace cooling
A: Hot-rolled steel,
B: Cold-rolled steels

TABLE 15

| Steel No. | Contact electrical resistance with respect to a carbon plate ($\Omega \cdot cm^2$) Static load applied: 12 kg/cm$^2$ Contact area of a test piece: 1 cm$^2$ Surface of a test piece: Polished with #600 Emery | Evaluation conducted when a separator plate was mounted inside a PEFC membrane electrode assembly Voltage drop ratio in membrane electrode Assembly after elapse of 1 hour: 1 − {V (after Passage of time)/V (initial)} | I value of tested materials: I value = (wt. % of C precipitated as Cr-containing carbide) × 100/{(wt. % of the entirety of C contained in steel) − 0.012%} | Resistance to intergranular corrosion (Strauss test) | Material type | Temperature (° C.) | Time | Cooling | Remarks |
|---|---|---|---|---|---|---|---|---|---|
| 1 | 0.76, 0.78 | 0.6–0.8 | 42 * | Through-crack | A | 960 | 2 h | AC | Compara- |
| 2 | 0.42, 0.48 | 0.6–0.8 | 75 * | Through-crack | A | 960 | 2 h | AC | tive |

TABLE 15-continued

| Steel No. | Contact electrical resistance with respect to a carbon plate ($\Omega \cdot cm^2$) Static load applied: 12 kg/cm$^2$ Contact area of a test piece: 1 cm$^2$ Surface of a test piece: Polished with #600 Emery | Evaluation conducted when a separator plate was mounted inside a PEFC membrane electrode assembly Voltage drop ratio in membrane electrode Assembly after elapse of 1 hour: 1 − {V (after Passage of time)/V (initial)} | I value of tested materials: I value = (wt. % of C precipitated as Cr-containing carbide) × 100/{(wt. % of the entirety of C contained in steel) − 0.012%} | Resistance to intergranular corrosion (Strauss test) | Final heat treatment conditions Material type | Temperature (° C.) | Time | Cooling | Remarks |
|---|---|---|---|---|---|---|---|---|---|
| 3 | 0.38, 0.35 | 0.6–0.8 | 83 * | Through-crack | A | 860 | 2 h | AC | examples |
| 3 | 0.42, 0.44 | >0.9 | 76 * | Through-crack | B | 860 | 1 h | AC | |
| 3 | 0.42, 0.42 | >0.8 | 68 * | Through-crack | B | 600 | 1 h | AC | |
| 3 | 0.46, 0.43 | >0.8 | 63 * | Through-crack | A | 800 | 20 m | AC | |
| 4 | 0.49, 0.48 | 0.6–0.8 | 81 * | Through-crack | A | 960 | 6 h | AC | |
| 5 | 0.45, 0.46 | 0.6–0.8 | 80 * | Through-crack | A | 960 | 6 h | AC | |
| 6 | 0.43, 0.41 | 0.6–0.8 | 78 * | Through-crack | B | 960 | 6 h | AC | |
| 7 | 0.49, 0.47 | 0.6–0.8 | 69 * | Through-crack | B | 980 | 3 m | AC | |
| 8 | 0.44, 0.43 | >0.9 | 58 * | Through-crack | B | 980 | 3 m | AC | |
| 9 | 0.66, 0.69 | 0.6–0.8 | 43 * | Through-crack | B | 980 | 3 m | AC | |
| 10 | 0.84, 0.83 | >0.8 | 82 * | Through-crack | A | 980 | 24 h | AC | |
| 11 | 0.72, 0.68 | >0.9 | 84 * | Through-crack | A | 980 | 24 h | AC | |
| 12 | 0.48, 0.51 | >0.9 | 83 * | Through-crack | A | 380 | 24 h | AC | |
| 13* | 0.52, 0.48 | <0.3 | 0 * | Generation of cracks | A | 920 | 1 m | AC | |
| 14* | 0.89, 0.89 | <0.3 | 0 * | No crack | A | 830 | 24 h | AC | |
| 15* | 0.92, 0.96 | 0.6–0.8 | 86 * | No crack | A | 830 | 24 h | AC | |
| 16* | 0.43, 0.46 | >0.8 | 81 * | NO crack | A | 830 | 24 h | AC | |
| 17* | 0.44, 0.42 | >0.8 | 30 * | No crack | A | 830 | 24 h | AC | |
| 18* | 0.43, 0.42 | >0.8 | 79 * | Generation of cracks | A | 830 | 24 h | AC | |
| 19* | 0.87, 0.84 | >0.8 | 81 * | Fragmentally broken | A | 830 | 24 h | AC | |
| 20* | 0.83, 0.84 | >0.8 | 82 * | Generation of cracks | A | 830 | 24 h | AC | |
| 21* | 0.43, 0.41 | >0.8 | 82 * | Generation of cracks | A | 830 | 24 h | AC | |

Symbol "*" refers to conditions outside the scope of the present invention.
AC: Air cooling
A: Hot-rolled steel,
B: Cold-rolled steel Cr carbide was caused to precipitate through heat treatment in test pieces for measuring contact electrical resistance. New test pieces for analysis were prepared by cutting the test pieces for measuring contact electrical resistance. The amount of C contained in precipitated Cr-containing carbide and the total amount of C in steel were obtained in the following manner. The I values obtained from the results are shown in Tables 2 and 3.

The amount (wt. % of C contained in precipitated Cr-containing carbide) was quantitatively determined on the basis of the results of quantitative determination of Cr in extraction residue, which was obtained after performance of controlled-current electrolysis of a test piece in a non-aqueous solution; i.e., an AA solution (10% acetylacetone—1% tetramethylammonium chloride-balance methanol). Specifically, a test piece was electrolyzed in a non-aqueous AA solution at a current density of 20 mA/cm$^2$ for approximately 3 hours, to thereby dissolve approximately 0.4 g thereof. Immediately after completion of electrolysis, the test piece was washed in a non-aqueous AA solution under application of ultrasound. The two AA solutions were combined, and filtered through a filter (0.2 μm) (Nucleopore, product of Coster Scientific Corporation). The residue on the filter was dissolved in a sulfuric acid-phosphoric acid mixture (sulfuric acid (special grade):phosphoric acid (special grade):distilled water=1:1 1). The Cr concentration was quantitatively determined through analysis by means of an inductively coupled plasma emission spectrometer (ICPV-1014, product of SHIMADZU CORPORATION). The C content was calculated under the assumption that all Cr assumed the form of $Cr_{23}C_6$.

The amount (wt. % of the entirety of C in steel) was quantitatively determined through a customarily employed infrared absorption spectrometry technique.

The test results are shown in Tables 7 and 8.

Even when steel sheets have the same chemical composition, the precipitation state of carbides varies depending on conditions of hot-rolling, cooling after hot-rolling, and heat treatment for precipitating Cr carbides. Thus, corrosion resistance, contact electrical resistance, and performance of a PEFC vary with the degree of formation of a chromium depletion layer.

All samples falling within the scope of the present invention have a contact electrical resistance as low as 0.2 Ω·cm$^2$ or less, whereas comparative samples have a contact electrical resistance as considerably high as 0.41–0.96 Ω·cm$^2$. Steel sample Nos. 13, 14, and 15 having a C content less than 0.01% have particularly high contact electrical resistance, due to a small amount of carbide precipitation.

The higher the I value, the greater the amount of Cr carbide which is precipitated from C in steel. When the I value is less than 80, contact electrical resistance with a carbon sheet and performance of a PEFC are unsatisfactory. The results show that contribution of I value is more significant when the C content in steel is low and that a low I value results in poor performance of a fuel cell.

In evaluation of characteristics of a bipolar plate incorporated into a PEFC, all samples falling within the scope of the present invention show a voltage drop ratio less than 0.05, whereas comparative samples having a chemical composition falling outside the scope of the present invention show a voltage drop ratio as considerably high as 0.2 to >0.8.

Steel sample Nos. 20 and 21 shown in Table 3 generated tearing from a side edge during hot rolling. Such tearing is called "edge tearing." As a measure to prevent edge tearing, suppressing the amount of S in steel is known to be effective. However, both steel sample Nos. 20 and 21 have an amount of S in steel of approximately 0.001%, which is considered considerably low in industrial production. Therefore, tearing during hot rolling is caused by a large amount of P or Si.

Steel sample No. 19 is a duplex stainless steel having both ferritic and austenitic metallurgical structures. Although a duplex stainless steel exhibits relatively high corrosion resistance, it has anisotropic specificity in processability at ambient temperature. Therefore, the steel is difficult to work into a bipolar plate, which must be formed from a thin sheet. Steel samples shown in Table 3 subjected to heat treatment; i.e., maintenance at 830° C. for 24 hours and cooling, exhibit satisfactory corrosion resistance, but exhibit significantly embrittlement due to precipitation of α-phase. In addition, the samples have high hardness, and polishing and machining thereof are considerably difficult.

The stainless steel for producing electrically-conducting elements maintains indirect contact electrical resistance for a long period of time even in a corrosive environment. Particularly, the steel is suitable for producing a bipolar plate of a PEFC and contributes to production of PEFCs at low cost.

What is claimed is:

1. A stainless steel product exhibiting low contact electrical resistance, wherein a conductive metallic inclusion of carbide and/or a conductive metallic inclusion of boride protrudes through an outer surface of passive film from stainless steel under the passive film.

2. A stainless steel product according to claim 1, wherein the metallic inclusion of carbide is $M_{23}C_6$, $M_4C$, $M_2C$, MC, or any mixture thereof and the metallic inclusion of boride is $M_2B$.

3. A stainless steel product according to claim 2, wherein a metallic element "M" in the metallic inclusion of carbide which is represented by $M_{23}C_6$, $M_2C$, or MC, and the metallic inclusion of boride which is represented by $M_2B$ comprises at least one of chromium, molybdenum, and tungsten.

4. A stainless steel product according to claim 1, wherein the surface roughness of the product is 0.06–5 μm as represented by an arithmetic mean roughness Ra.

5. A stainless steel product according to claim 2, wherein the surface roughness of the product is 0.06–5 μm as represented by an arithmetical mean roughness Ra.

6. A stainless steel product according to claim 1, wherein the product is made of a ferritic stainless steel having the following composition, in mass percent:

C: 0.15% or less,
Si: 0.01–1.5%,
Mn: 0.01–1.5%,
P: 0.04% or less,
S: 0.01% or less,
N: 0.05% or less,
Cr: 10–36%,
Al: 0.001–6%,
B: 0–3.5%,
Ni: 0–5%,
Mo: 0–7%,
Cu: 0–1%,
V: 0–0.3%,
Ti: 0 to 25×(C%+N%),
Nb: 0 to 25×(C%+N%),
rare earth elements: 0–0.1%,
W: 0–4%, and
balance: Fe and impurities.

7. A stainless steel product according to claim 2, wherein the product is made of a ferritic stainless steel having the following composition, in mass percent:

C: 0.15% or less,
Si: 0.01–1.5%,
Mn: 0.01–1.5%,
P: 0.04% or less,
S: 0.01% or less,
N: 0.05% or less,
Cr: 10–36%,
Al: 0.001–6%,
B: 0–3.5%,
Ni: 0–5%,
Mo: 0–7%,
Cu: 0–1%,
V: 0–0.3%,
Ti: 0 to 25×(C%+N%),
Nb: 0 to 25×(C%+N%),
rare earth elements: 0–0.1%,
W: 0–4%, and
balance: Fe and impurities.

8. A stainless steel product according to claim 1, wherein the product is made of a ferritic stainless steel having the following composition, in mass percent:

C: 0.15% or less,
Si: 0.01–1.5%,
Mn: 0.01–1.5%,
P: 0.04% or less,
S: 0.01% or less,
N: 0.035% or less,
Cr: 15–36%,
Al: 0.001–6%,
B: 0–3.5%,
Ni: 0–5%,
Mo: 0–7%,
Cu: 0–1%,
Ti: 0 to 25×(C%+N%),
Nb: 0 to 25×(C%+N%),
balance: Fe and impurities; and
satisfying the following relationship:

$$13\% < Cr + 3 \times Mo - 2.5 \times B < 50\%$$

wherein each elemental symbol represents its content in mass percent.

9. A stainless steel product according to claim 2, wherein the product is made of a ferritic stainless steel having the following composition, in mass percent:

C: 0.15% or less,
Si: 0.01–1.5%,
Mn: 0.01–1.5%,
P: 0.04% or less,
S: 0.01% or less,
N: 0.035% or less,
Cr: 15–36%,
Al: 0.001–6%,
B: 0–3.5%,
Ni: 0–5%,
Mo: 0–7%,
Cu: 0–1%,
Ti: 0 to 25×(C%+N%),
Nb: 0 to 25×(C%+N%),
W: 0–4%,
balance: Fe and impurities; and satisfying the following relationship:

$$13\% < Cr + 3 \times Mo - 2.5 \times B \leq 50\%$$

wherein each elemental symbol represents its content in mass percent.

10. A stainless steel product according to claim 1, wherein the product is made of a ferritic stainless steel having the following composition, in mass percent:
C: 0.01–0.15%,
Si: 0.01–1.5%,
Mn: 0.01–1%,
P: 0.035% or less,
S: 0.01% or less,
Cr: 10–35%,
Ni: 0.01–1%,
Cu: 0.01–1%,
N: 0.05% or less,
V: 0.3% or less,
Al: 0.001–0.2%,
Mo: 0–6%,
W: 0–4%,
rare earth elements: 0–0.1%,
Cr+3Mo:13–50%,
balance: Fe and impurities; and
C which has precipitated as a Cr-containing carbide and the total C in steel satisfy the following relationship:

(C mass % precipitated as Cr-containing carbide)×100/(total C mass % in steel−0.0015%)≧80.

11. A stainless steel product according to claim 2, wherein the product is made of a ferritic stainless steel having the following composition, in mass percent:
C: 0.01–0.15%,
Si: 0.01–1.5%,
Mn: 0.01–1%,
P: 0.035% or less,
S: 0.01% or less,
Cr: 10–35%,
Ni: 0.01–1%,
Cu: 0.01–1%,
N: 0.05% or less,
V: 0.3% or less,
Al: 0.001–0.2%,
Mo: 0–6%,
W: 0–4%,
rare earth elements: 0–0.1%,
Cr+3Mo: 13–50%,
balance: Fe and impurities; and
C which has precipitated as a Cr-containing carbide and the total C in steel satisfy the following relationship:

(C mass % precipitated as Cr-containing carbide)×100/(total C mass % in steel−0.0015%)≧80.

12. A stainless steel product according to claim 1, wherein the product is made of a ferritic stainless steel having the following composition, in mass percent:
C: 0.08% or less,
Si: 0.01–1.5%,
Mn: 0.01–1.5%,
P: 0.035% or less,
S: 0.01% or less,
Cr: 17–36%,
Al: 0.001–0.2%,
B: 0.0005–3.5%,
N: 0.035% or less,
Ni: 0–5%,
Mo: 0–7%,
Cu: 0–1%,
balance: Fe and impurities; and
satisfying the following relationship:

$$13\% \leq Cr + 3 \times Mo - 2.5 \times B \leq 50\%$$

wherein each elemental symbol represents its content in mass percent; and

B in the steel is present as a precipitate of $M_2B$ boride.

13. A stainless steel product according to claim 2, wherein the product is made of a ferritic stainless steel having the following composition, in mass percent:
C: 0.08% or less,
Si: 0.01–1.5%,
Mn: 0.01–1.5%,
P: 0.035% or less,
S: 0.01% or less,
Cr: 17–36%,
Al: 0.001–0.2%,
B: 0.0005–3.5%,
N: 0.035% or less,
Ni: 0–5%,
Mo: 0–7%,
Cu: 0–1%,
balance: Fe and impurities; and
satisfying the following relationship:

$$13\% \leq Cr + 3 \times Mo - 2.5 \times B \leq 50\%$$

wherein each elemental symbol represents its content in mass percent; and

B in the steel is present as a precipitate of $M_2B$ boride.

14. A stainless steel product according to claim 1, wherein the product is made of an austenitic stainless steel having the following composition, in mass percent:

C: 0.005–0.2%,
Si: 0.01–1.5%,
Mn: 0.01–2.5%,
P: 0.04% or less,
S: 0.01% or less,
Cr: 17–30%,
Ni: 7–50%,
B: 0–3.5%,
N: 0–0.4%,
Cu: 0–3%,
Al: 0–6%,
Mo: 0–7%, and
balance: Fe and impurities.

15. A stainless steel product according to claim 2, wherein the product is made of an austenitic stainless steel having the following composition, in mass percent:
C: 0.005–0.2%,
Si: 0.01–1.5%,
Mn: 0.01–2.5%,
P: 0.04% or less,
S: 0.01% or less,
Cr: 17–30%,
Ni: 7–50%,
B: 0–3.5%,
N: 0–0.4%,
Cu: 0–3%,
Al: 0–6%,
Mo: 0–7%, and
balance: Fe and impurities.

16. A stainless steel product according to claim 1, wherein the product is made of an austenitic stainless steel having the following composition, in mass percent:
C: 0.005–0.2%,
Si: 0.01–1.5%,
Mn: 0.01–2.5%,
P: 0.04% or less,
S: 0.01% or less,
Cr: 17–30%,
Ni: 7–50%,
B: 0–3.5%,
N: 0–0.4%,
Cu: 0–2%,
Al: 0–6%,
Mo: 0–7%,
balance: Fe and impurities; and
satisfying the following relationship:

$$13\% \leq Cr + 3 \times Mo - 2.5 \times B \leq 50\%$$

wherein each elemental symbol represents its content in mass percent.

17. A stainless steel product according to claim 2, wherein the product is made of an austenitic stainless steel having the following composition, in mass percent:
C: 0.005–0.2%,
Si: 0.01–1.5%,
Mn: 0.01–2.5%,
P: 0.04% or less,
S: 0.01% or less,
Cr: 17–30%,
Ni: 7–50%,
B: 0–3.5%,
N: 0–0.4%,
Cu: 0–2%,
Al: 0–6%,
Mo: 0–7%,
balance: Fe and impurities; and
satisfying the following relationship:

$$13\% \leq Cr + 3 \times Mo - 2.5 \times B \leq 50\%$$

wherein each elemental symbol represents its content in mass percent.

18. A stainless steel product according to claim 1, wherein the product is made of an austenitic stainless steel having the following composition, in mass percent:
C: 0.03% or less,
Si: 0.01–1.5%,
Mn: 0.01–2.5%,
P: 0.035% or less,
S: 0.01% or less,
Cr: 17–30%,
Ni: 7–50%,
B: 0.0005–3.5%,
Al: 0.001–0.2%,
N: 0.3% or less,
Mo: 0–7%,
Cu: 0–3%,
balance: Fe and impurities; and
satisfying the following relationship:

$$13\% \leq Cr + 3 \times Mo - 2.5 \times B \leq 50\%$$

wherein each elemental symbol represents its content in mass percent; and

B in the steel is present as a precipitate of $M_2B$ boride.

19. A stainless steel product according to claim 2, wherein the product is made of an austenitic stainless steel having the following composition, in mass percent:
C: 0.03% or less,
Si: 0.01–1.5%,
Mn: 0.01–2.5%,
P: 0.035% or less,
S: 0.01% or less,
Cr: 17–30%,
Ni: 7–50%,
B: 0.0005–3.5%,
Al: 0.001–0.2%,
N: 0.3% or less,
Mo: 0–7%,
Cu: 0–3%,
balance: Fe and impurities; and
satisfying the following relationship:

$$13\% \leq Cr + 3 \times Mo - 2.5 \times B \leq 50\%$$

wherein each elemental symbol represents its content in mass percent; and

B in the steel is present as a precipitate of $M_2B$ boride.

20. A stainless steel product according to claim 1, wherein the product is formed of an austenitic stainless steel having the following composition, in mass percent:

C: 0.15–0.2%,
Si: 0.01–1.5%,
Mn: 0.01–2.5%,
P: 0.035% or less,
S: 0.01% or less,
Cr: 17–30%,
Ni: 7–50%,
Cu: 0–3%,
N: 0.3% or less,
Mo: 0–7%,
Al: 0–0.2%,
Cr+3Mo:13–50%,
balance: Fe and impurities; and
C which has precipitated as a Cr-containing carbide and the total C in steel satisfy the following relationship:

(C mass % precipitated as Cr-containing carbide)×100/(total C mass % in steel−0.012%)≧85.

21. A stainless steel product according to claim 2, wherein the product is formed of an austenitic stainless steel having the following composition, in mass percent:

C: 0.015–0.2%,
Si: 0.01–1.5%,
Mn: 0.01–2.5%,
P: 0.035% or less,
S: 0.01% or less,
Cr: 17–30%,
Ni: 7–50%,
Cu: 0–3%,
N: 0.3% or less,
Mo: 0–7%,
Al: 0–0.2%,
Cr+3Mo:13–50%,
balance: Fe and impurities; and
C which has precipitated as a Cr-containing carbide and the total C in steel satisfy the following relationship.

(C mass % precipitated as Cr-containing carbide)×100/(total C mass % in steel−0.012%)≧85.

22. A method for producing a stainless steel product having a low contact electrical resistance, which comprises:
 corroding the surface of a stainless steel product by use of an aqueous acidic solution so as to expose a conductive metallic inclusion of carbide and/or a conductive metallic inclusion of boride on the surface;
 neutralizing the product by use of an aqueous alkaline solution having a pH of 7 or more; and,
 washing and drying the product.

23. A method according to claim 22, wherein the aqueous acidic solution contains 2–20 mass % hydrofluoric acid and 5–20 mass % nitric acid.

24. A method according to claim 22, wherein an average amount of corrosion by the aqueous acidic solution is 5–60 g/m$^2$.

25. A bipolar plate for a polymer electrode fuel cell, which bipolar plate comprises a stainless steel product as recited in claim 1.

26. A bipolar plate for a polymer electrode fuel cell, which bipolar plate comprises a stainless steel product as recited in claim 2.

27. A polymer electrode fuel cell in which a fuel gas and an oxidizing agent gas are supplied to an assembly produced by laminating a plurality of membrane electrode assemblies while inserting a bipolar plate between membrane electrode assemblies to thereby generate DC power, which fuel cell has a bipolar plate as recited in claim 25.

28. A polymer electrode fuel cell in which a fuel gas and an oxidizing agent gas are supplied to an assembly produced by laminating a plurality of membrane electrode assemblies while inserting a bipolar plate between membrane electrode assemblies to thereby generate DC power, which fuel cell has a bipolar plate as recited in claim 26.

* * * * *